United States Patent
Ly et al.

(10) Patent No.: US 12,137,436 B2
(45) Date of Patent: *Nov. 5, 2024

(54) FREQUENCY HOPPING TECHNIQUES FOR UPLINK SHARED CHANNEL REPETITIONS

(71) Applicant: QUALCOMM Incorporated, San Diego, CA (US)

(72) Inventors: Hung Dinh Ly, San Diego, CA (US); Gokul Sridharan, Sunnyvale, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 17/216,402

(22) Filed: Mar. 29, 2021

(65) Prior Publication Data

US 2022/0312383 A1    Sep. 29, 2022

(51) Int. Cl.
*H04B 1/00* (2006.01)
*H04B 1/7143* (2011.01)
*H04L 5/00* (2006.01)
*H04W 72/02* (2009.01)
*H04W 72/0446* (2023.01)
(Continued)

(52) U.S. Cl.
CPC .......... *H04W 72/02* (2013.01); *H04B 1/7143* (2013.01); *H04L 5/0012* (2013.01);
(Continued)

(58) Field of Classification Search
CPC ............. H04W 72/02; H04W 72/0446; H04W 72/0453; H04W 72/23; H04L 5/0012;
(Continued)

(56) References Cited

U.S. PATENT DOCUMENTS 11,502,721 B2   11/2022   Ly et al.
2019/0053211 A1*   2/2019   Ying .................. H04W 72/044
(Continued)

OTHER PUBLICATIONS

International Search Report and Written Opinion—PCT/US2022/020551—ISA/EPO—Jul. 1, 2022.
(Continued)

*Primary Examiner* — Faruk Hamza
*Assistant Examiner* — Aixa A Guadalupe Cruz
(74) *Attorney, Agent, or Firm* — Holland & Hart LLP/Qualcomm Incorporated

(57) ABSTRACT

Methods, systems, and devices for wireless communications are described. A user equipment (UE) may receive, from a base station, a control message identifying a frequency hop configuration that configures the UE to use frequency hopping when transmitting repetitions of an uplink shared channel transmission. The UE, the base station, or both may determine, based on the UE being configured with the frequency hop configuration, a frequency hop for each repetition of the uplink shared channel transmission. Each frequency hop may be determined based on a corresponding uplink shared channel index for a respective repetition a frequency hop for each repetition of the uplink shared channel transmission. The uplink shared channel index may be an uplink transmission occasion index, or a repetition index. The UE may transmit the repetitions of the uplink shared channel transmission using respective frequency hops in accordance with the determination and the frequency hop configuration.

30 Claims, 18 Drawing Sheets

(51) Int. Cl.
  *H04W 72/0453* (2023.01)
  *H04W 72/12* (2023.01)
  *H04W 72/1268* (2023.01)
  *H04W 72/23* (2023.01)

(52) U.S. Cl.
  CPC ... *H04W 72/0446* (2013.01); *H04W 72/0453* (2013.01); *H04W 72/1268* (2013.01); *H04W 72/23* (2023.01)

(58) Field of Classification Search
  CPC ....... H04L 1/08; H04L 5/0044; H04B 1/7136; H04B 1/713
  See application file for complete search history.

(56) References Cited

U.S. PATENT DOCUMENTS

| | | | |
|---|---|---|---|
| 2020/0052827 A1* | 2/2020 | Vilaipornsawai | H04L 5/0044 |
| 2022/0191944 A1* | 6/2022 | Reial | H04W 74/008 |
| 2022/0304019 A1* | 9/2022 | Takahashi | H04L 5/0012 |
| 2022/0377767 A1 | 11/2022 | Ying et al. | |
| 2023/0171769 A1* | 6/2023 | Chen | H04L 1/189 370/329 |

OTHER PUBLICATIONS

LG Electronics: "Discussions on TB Processing Over Multi-Slot PUSCH", 3GPP TSG RAN WG1 #104-e, R1-2100713, 3GPP, Mobile Competence Centre, 650, Route Des Lucioles, F-06921 Sophia-Antipolis, France, vol. RAN WG1, No. e-Meeting, Jan. 25, 2021-Feb. 5, 2021, Jan. 19, 2021 (Jan. 19, 2021), pp. 1-4, XP051971168, URL: https://ftp.3qpp.orq/tsq_ran/WG1_SGR1_104-e/Docs/R1-2100713.zip R1-2100713 LG_CE_TB processing over multi-slot PUSCH.docx.

PANASONIC: "Discussion on Enhancements on PUSCH Repetition Type A", 3GPP TSG RAN WG1 #104-e, R1-2101017, 3GPP, Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 18, 2021, XP051970603, pp. 1-16, URL: https://ftp.3gpp.org/tsg_ran/WG1_RL1/TSGR1_104-e/Docs/R1-2101017.zip R1-2101017.docx.

Wilus Inc: "Discussion on Joint Channel Estimation for PUSCH", 3GPP TSG RAN WG1 #104-e, R1-2101681, 3GPP, Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021, XP051971834, 3 Pages, URL: https://ftp.3gpp.org/tsg_ran/WG1_RL1/TSGR1_104-e/Docs/R1-2101681.zip R1-2101681_Joint_channel_estimation_final.docx.

ZTE Corporation: "Discussion on Potential Techniques for PUSCH", 3GPP TSG RAN WG1 #103-e, R1-2007743, 3GPP, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020, pp. 1-12, XP051939883, URL: https://ftp.3gpp.org/tsg_ran/WG1_RL1/TSGR1_103-e/Docs/R1-2007743.zip R1-2007743 Discussion on potential techniques for PUSCH.docx.

* cited by examiner

FREQUENCY HOPPING TECHNIQUES FOR UPLINK SHARED CHANNEL REPETITIONS

FIELD OF TECHNOLOGY

The following relates to wireless communications, including frequency hopping techniques for uplink shared channel repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications, a UE may transmit multiple repetitions of an uplink transmission, for example, to increase communication quality of the uplink transmission. In some cases, the UE may be configured to transmit the repetitions using frequency hops. Conventional methods for transmitting the repetitions using frequency hops may be improved.

SUMMARY

The described techniques relate to improved methods, systems, devices, and apparatuses that support frequency hopping techniques for uplink shared channel repetitions. Generally, the described techniques provide for enhanced methods for determining a frequency hop to apply to each repetition to improve uplink transmission performance. A user equipment (UE) may receive, from a base station, a control message (e.g., physical downlink control channel (PDCCH) message, downlink control information (DCI)) identifying a frequency hop configuration that configures the UE to use frequency hopping when transmitting repetitions of an uplink shared channel transmission (e.g., physical uplink shared channel (PUSCH) transmission). The UE, the base station, or both may determine, based on the UE being configured with the frequency hop configuration, a frequency hop for each repetition of the uplink shared channel transmission. Each frequency hop may be determined based on a corresponding uplink shared channel index, such as an uplink transmission occasion index, or a repetition index, for a respective repetition a frequency hop for each repetition of the uplink shared channel transmission. For example, the frequency hop used for each repetition may be based on an index of an uplink transmission occasion or an index associated with the repetition. The frequency hop used for each repetition may be based on the index being even or odd. Determining the frequency hop to apply to each repetition based on the uplink shared channel index may improve uplink transmission performance by increasing the alternation between frequency hops and by balancing the frequency hop usage. The UE may transmit the repetitions of the uplink shared channel transmission using respective frequency hops in accordance with the determination and the frequency hop configuration.

A method for wireless communications at a UE is described. The method may include receiving a control message identifying a frequency hop configuration that configures the UE to use frequency hopping when transmitting repetitions of an uplink shared channel, determining, based on the UE being configured with the frequency hop configuration, a frequency hop for each repetition of the uplink shared channel, each frequency hop determined based on a corresponding uplink shared channel index for a respective repetition, and transmitting the repetitions of the uplink shared channel using respective frequency hops in accordance with the determination and the frequency hop configuration in slots available for uplink shared channel transmissions.

An apparatus for wireless communications is described. The apparatus may include a processor, memory coupled with the processor, and instructions stored in the memory. The instructions may be executable by the processor to cause the apparatus to receive a control message identifying a frequency hop configuration that configures the UE to use frequency hopping when transmitting repetitions of an uplink shared channel, determine, based on the UE being configured with the frequency hop configuration, a frequency hop for each repetition of the uplink shared channel, each frequency hop determined based on a corresponding uplink shared channel index for a respective repetition, and transmit the repetitions of the uplink shared channel using respective frequency hops in accordance with the determination and the frequency hop configuration in slots available for uplink shared channel transmissions.

Another apparatus for wireless communications is described. The apparatus may include means for receiving a control message identifying a frequency hop configuration that configures the UE to use frequency hopping when transmitting repetitions of an uplink shared channel, means for determining, based on the UE being configured with the frequency hop configuration, a frequency hop for each repetition of the uplink shared channel, each frequency hop determined based on a corresponding uplink shared channel index for a respective repetition, and means for transmitting the repetitions of the uplink shared channel using respective frequency hops in accordance with the determination and the frequency hop configuration in slots available for uplink shared channel transmissions.

A non-transitory computer-readable medium storing code for wireless communications at a UE is described. The code may include instructions executable by a processor to receive a control message identifying a frequency hop configuration that configures the UE to use frequency hopping when transmitting repetitions of an uplink shared channel, determine, based on the UE being configured with the frequency hop configuration, a frequency hop for each repetition of the uplink shared channel, each frequency hop determined based on a corresponding uplink shared channel index for a respective repetition, and transmit the repetitions of the uplink shared channel using respective frequency hops in accordance with the determination and the frequency hop configuration in slots available for uplink shared channel transmissions.

In some examples of the method, apparatuses, and non-transitory computer-readable medium described herein, determining the frequency hop for each repetition of the uplink shared channel may include operations, features, means, or instructions for determining the frequency hop for a selected repetition of the uplink shared channel based on an uplink shared channel transmission occasion index corresponding to the selected repetition, where the uplink shared channel transmission occasion index may be the uplink shared channel index and pertains to a slot available for uplink shared channel transmissions.

In some examples of the method, apparatuses, and non-transitory computer-readable medium described herein, determining the frequency hop for each repetition of the uplink shared channel may include operations, features, means, or instructions for determining the frequency hop for a selected repetition of the uplink shared channel based on an uplink shared channel repetition index corresponding to the selected repetition, where the uplink shared channel repetition index may be the uplink shared channel index.

In some examples of the method, apparatuses, and non-transitory computer-readable medium described herein, determining the frequency hop for each repetition of the uplink shared channel may include operations, features, means, or instructions for determining the frequency hop for a selected repetition of the uplink shared channel based on a logical index sequentially indexing each of the slots available for uplink shared channel transmissions, where the logical index may be the uplink shared channel index.

Some examples of the method, apparatuses, and non-transitory computer-readable medium described herein may further include operations, features, means, or instructions for receiving an additional message indicating that at least a portion of a repetition allocated to a slot may be canceled, determining that a number of symbols occupied by the repetition may be below a threshold, and transmitting the repetition using a frequency hop associated with a previous repetition.

Some examples of the method, apparatuses, and non-transitory computer-readable medium described herein may further include operations, features, means, or instructions for receiving a configuration message indicating a counting configuration for allocating each repetition of the uplink shared channel to a respective slot of a set of multiple slots, receiving an indication of a number of repetitions to transmit for the uplink shared channel, and allocating each repetition, up to the number of repetitions, to the set of multiple slots in accordance with the counting configuration.

In some examples of the method, apparatuses, and non-transitory computer-readable medium described herein, allocating each repetition to the slot may include operations, features, means, or instructions for allocating each repetition, up to the number of repetitions, to uplink configured slots only, where an uplink configured slot may be an uplink slot or a special slot available for uplink shared channel transmissions and transmitting each repetition that may be allocated to the uplink configured slots.

In some examples of the method, apparatuses, and non-transitory computer-readable medium described herein, allocating each repetition may include operations, features, means, or instructions for identifying a set of multiple repetitions, where each repetition of the set of multiple repetitions may be allocated to an uplink configured slot, where the uplink configured slot may be an uplink slot or a special slot available for uplink shared channel transmissions.

Some examples of the method, apparatuses, and non-transitory computer-readable medium described herein may further include operations, features, means, or instructions for assigning a first uplink shared channel index to a first repetition of the set of multiple repetitions and determining a first frequency hop for the first repetition based on the first uplink shared channel index being even.

Some examples of the method, apparatuses, and non-transitory computer-readable medium described herein may further include operations, features, means, or instructions for assigning a second uplink shared channel index to a second repetition of the set of multiple repetitions and determining a second frequency hop for the second repetition based on the second uplink shared channel index being odd.

Some examples of the method, apparatuses, and non-transitory computer-readable medium described herein may further include operations, features, means, or instructions for identifying a set of multiple uplink transmission occasions and assigning each uplink transmission occasion of the set of multiple uplink transmission occasions an uplink shared channel index.

Some examples of the method, apparatuses, and non-transitory computer-readable medium described herein may further include operations, features, means, or instructions for determining the frequency hop for each repetition may be based on the uplink shared channel index assigned to each uplink transmission occasion being even or odd.

Some examples of the method, apparatuses, and non-transitory computer-readable medium described herein may further include operations, features, means, or instructions for assigning a first uplink shared channel index to a first uplink transmission occasion of the set of multiple uplink transmission occasions, a repetition allocated to the first uplink transmission occasion and determining a first frequency hop for the repetition allocated to the first uplink transmission occasion based on the first uplink shared channel index being even.

Some examples of the method, apparatuses, and non-transitory computer-readable medium described herein may further include operations, features, means, or instructions for assigning a second uplink shared channel index to a second uplink transmission occasion of the set of multiple uplink transmission occasions, a repetition allocated to the second uplink transmission occasion and determining a second frequency hop for the repetition allocated to the second uplink transmission occasion based on the second uplink shared channel index being odd.

In some examples of the method, apparatuses, and non-transitory computer-readable medium described herein, transmitting the repetitions of the uplink shared channel may include operations, features, means, or instructions for transmitting each repetition of the uplink shared channel in a same starting location in each of a set of multiple uplink configured slots, where each repetition may be transmitted for a same duration.

In some examples of the method, apparatuses, and non-transitory computer-readable medium described herein, the UE transmits the repetitions of the uplink shared channel in accordance with a time division duplexing frame structure or a frequency division duplexing frame structure.

A method for wireless communications at a base station is described. The method may include transmitting a control message identifying a frequency hop configuration that configures a UE to use frequency hopping when transmitting repetitions of an uplink shared channel, determining, based on the UE being configured with the frequency hop configuration, a frequency hop for each repetition of the uplink shared channel, each frequency hop determined based on a corresponding uplink shared channel index for a respective repetition, and receiving the repetitions of the uplink shared channel using respective frequency hops in accordance with the determination and the frequency hop configuration in slots available for uplink shared channel transmissions.

An apparatus for wireless communications is described. The apparatus may include a processor, memory coupled with the processor, and instructions stored in the memory. The instructions may be executable by the processor to cause the apparatus to transmit a control message identifying a frequency hop configuration that configures a UE to use frequency hopping when transmitting repetitions of an uplink shared channel, determine, based on the UE being configured with the frequency hop configuration, a frequency hop for each repetition of the uplink shared channel, each frequency hop determined based on a corresponding uplink shared channel index for a respective repetition, and receive the repetitions of the uplink shared channel using respective frequency hops in accordance with the determination and the frequency hop configuration in slots available for uplink shared channel transmissions.

Another apparatus for wireless communications is described. The apparatus may include means for transmitting a control message identifying a frequency hop configuration that configures a UE to use frequency hopping when transmitting repetitions of an uplink shared channel, means for determining, based on the UE being configured with the frequency hop configuration, a frequency hop for each repetition of the uplink shared channel, each frequency hop determined based on a corresponding uplink shared channel index for a respective repetition, and means for receiving the repetitions of the uplink shared channel using respective frequency hops in accordance with the determination and the frequency hop configuration in slots available for uplink shared channel transmissions.

A non-transitory computer-readable medium storing code for wireless communications at a base station is described. The code may include instructions executable by a processor to transmit a control message identifying a frequency hop configuration that configures a UE to use frequency hopping when transmitting repetitions of an uplink shared channel, determine, based on the UE being configured with the frequency hop configuration, a frequency hop for each repetition of the uplink shared channel, each frequency hop determined based on a corresponding uplink shared channel index for a respective repetition, and receive the repetitions of the uplink shared channel using respective frequency hops in accordance with the determination and the frequency hop configuration in slots available for uplink shared channel transmissions.

In some examples of the method, apparatuses, and non-transitory computer-readable medium described herein, determining the frequency hop for each repetition of the uplink shared channel may include operations, features, means, or instructions for determining the frequency hop for a selected repetition of the uplink shared channel based on an uplink shared channel transmission occasion index corresponding to the selected repetition, where the uplink shared channel transmission occasion index may be the uplink shared channel index and pertains to a slot available for uplink shared channel transmissions.

In some examples of the method, apparatuses, and non-transitory computer-readable medium described herein, determining the frequency hop for each repetition of the uplink shared channel may include operations, features, means, or instructions for determining the frequency hop for a selected repetition of the uplink shared channel based on an uplink shared channel repetition index corresponding to the selected repetition, where the uplink shared channel repetition index may be the uplink shared channel index.

In some examples of the method, apparatuses, and non-transitory computer-readable medium described herein, determining the frequency hop for each repetition of the uplink shared channel may include operations, features, means, or instructions for determining the frequency hop for a selected repetition of the uplink shared channel based on a logical index sequentially indexing each of the slots available for uplink shared channel transmissions, where the logical index may be the uplink shared channel index.

Some examples of the method, apparatuses, and non-transitory computer-readable medium described herein may further include operations, features, means, or instructions for transmitting an additional message indicating that at least a portion of a repetition allocated to a slot may be canceled and receiving the repetition using a frequency hop associated with a previous repetition based on a number of symbols occupied by the repetition being below a threshold.

Some examples of the method, apparatuses, and non-transitory computer-readable medium described herein may further include operations, features, means, or instructions for transmitting a configuration message indicating a counting configuration for allocating each repetition of the uplink shared channel to a respective slot of a set of multiple slots, transmitting an indication of a number of repetitions to transmit for the uplink shared channel, and allocating each repetition, up to the number of repetitions, to the set of multiple slots in accordance with the counting configuration.

In some examples of the method, apparatuses, and non-transitory computer-readable medium described herein, allocating each repetition to the slot may include operations, features, means, or instructions for allocating each repetition, up to the number of repetitions, to uplink configured slots only, where an uplink configured slot may be an uplink slot or a special slot available for uplink shared channel transmissions and receiving each repetition that may be allocated to the uplink configured slots.

Some examples of the method, apparatuses, and non-transitory computer-readable medium described herein may further include operations, features, means, or instructions for identifying a set of multiple repetitions, where each repetition of the set of multiple repetitions may be allocated to an uplink configured slot, where the uplink configured slot may be an uplink slot or a special slot available for uplink shared channel transmissions, assigning a first uplink shared channel index to a first repetition of the set of multiple repetitions, and determining a first frequency hop for the first repetition based on the first uplink shared channel index being even.

Some examples of the method, apparatuses, and non-transitory computer-readable medium described herein may further include operations, features, means, or instructions for identifying a set of multiple repetitions, where each repetition of the set of multiple repetitions may be allocated to an uplink configured slot, where the uplink configured slot may be an uplink slot or a special slot available for uplink shared channel transmissions, assigning a second uplink shared channel index to a second repetition of the set of multiple repetitions, and determining a second frequency hop for the second repetition based on the second uplink shared channel index being odd.

Some examples of the method, apparatuses, and non-transitory computer-readable medium described herein may further include operations, features, means, or instructions for identifying a set of multiple uplink transmission occasions and assigning each uplink transmission occasion of the set of multiple uplink transmission occasions an uplink shared channel index.

Some examples of the method, apparatuses, and non-transitory computer-readable medium described herein may further include operations, features, means, or instructions for determining the frequency hop for each repetition may be based on the uplink shared channel index assigned to each uplink transmission occasion being even or odd.

Some examples of the method, apparatuses, and non-transitory computer-readable medium described herein may further include operations, features, means, or instructions for assigning a first uplink shared channel index to a first uplink transmission occasion of the set of multiple uplink transmission occasions, a repetition allocated to the first uplink transmission occasion and determining a first frequency hop for the repetition allocated to the first uplink transmission occasion based on the first uplink shared channel index being even.

Some examples of the method, apparatuses, and non-transitory computer-readable medium described herein may further include operations, features, means, or instructions for assigning a second uplink shared channel index to a second uplink transmission occasion of the set of multiple uplink transmission occasions, a repetition allocated to the second uplink transmission occasion and determining a second frequency hop for the repetition allocated to the second uplink transmission occasion based on the second uplink shared channel index being odd.

In some examples of the method, apparatuses, and non-transitory computer-readable medium described herein, receiving the repetitions of the uplink shared channel may include operations, features, means, or instructions for receiving each repetition of the uplink shared channel in a same starting location in each of a set of multiple uplink configured slots, where each repetition may be transmitted for a same duration.

DETAILED DESCRIPTION

Figure 1:
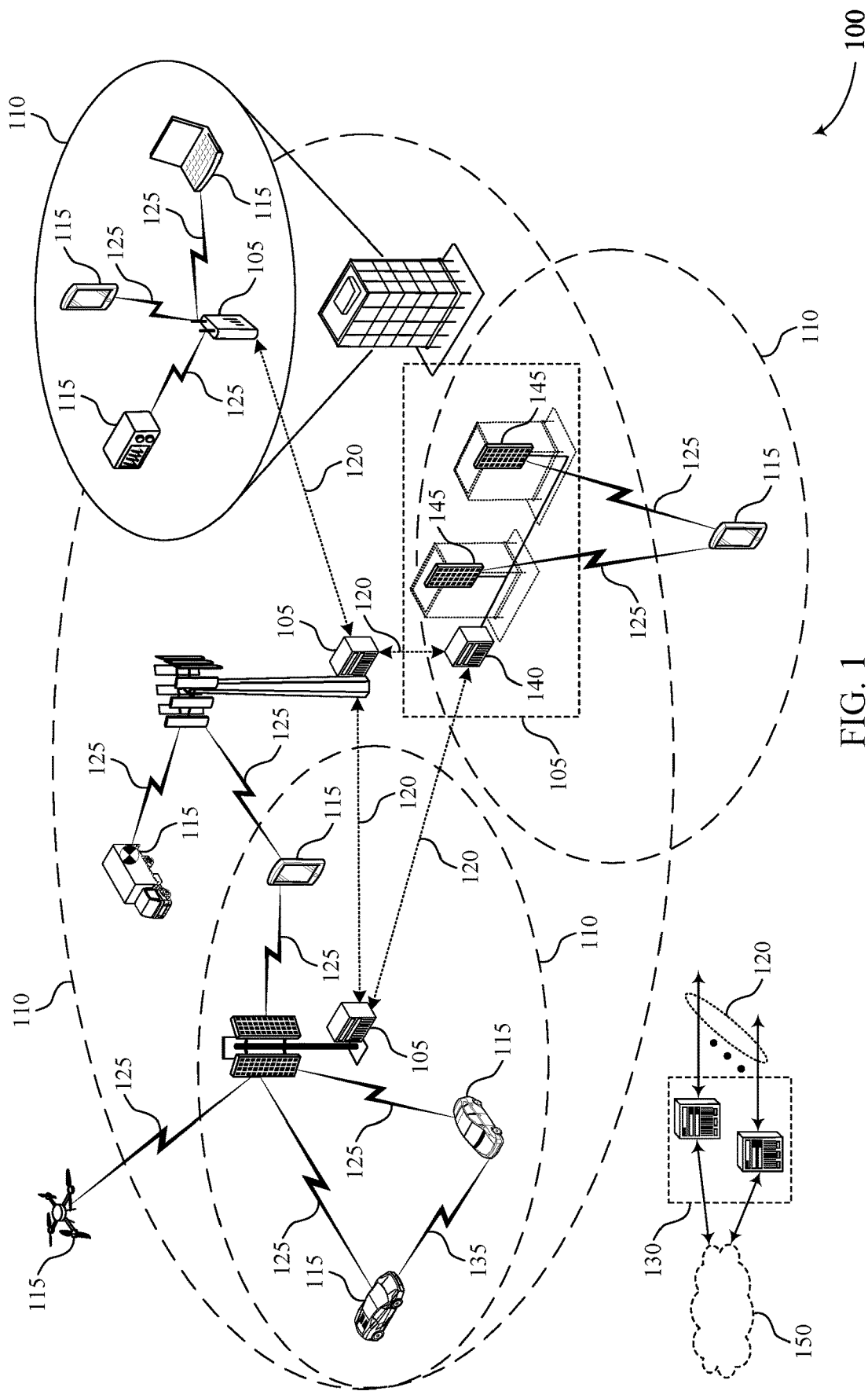
FIG. 1 illustrates an example of a wireless communications system that supports frequency hopping techniques for uplink shared channel repetitions in accordance with aspects of the present disclosure.

In some wireless communications systems, a scheduling device (for example, network devices such as base stations) may configure devices (e.g., a user equipment (UE)) to send transmissions multiple times to increase a probability that contents of the transmissions (for example, data, control information, or other types of information included in the transmissions) are successfully received and decoded at an intended device. For example, a transmitting device may repeat a transmission a number of times (for example, a number of repetitions), such that a device receiving the transmitted data may combine the different repetitions to successfully receive the transmitted data. In some examples, a base station may transmit downlink messages to a UE according to a number of repetitions to increase a likelihood that the UE can successfully receive and decode the downlink messages. Additionally or alternatively, the base station may schedule the UE to transmit an uplink message according to a number of repetitions to increase a likelihood that the base station can successfully receive and decode the uplink message, thereby increasing reliability that the uplink message is successfully communicated to the base station.

In some cases, a transmitting device may be configured to transmit the repetitions using a frequency hopping procedure to further improve transmission performance by providing frequency diversity. For example, frequency hopping may include using different frequency resources (for example, carriers or subcarriers) over one or more time resources (for example, symbols, mini-slots, slots, subframes, or frames). As such, the transmitting device may transmit each repetition using a frequency hop. In some wireless communications systems, the transmitting device may determine which frequency hop to use for each repetition based on a physical slot number, where the frequency hop may be based on the physical slot number being even or odd. For example, the transmitting device may transmit a repetition allocated to physical slot one using a first frequency hop based on physical slot one being odd, and the transmitting device may transmit a repetition allocated to physical slot two using a second frequency hop based on physical slot one being even. However, configuring the frequency hops based on the physical slot number may result in an unbalanced usage of frequency where the frequency hops may not be alternated and/or one frequency hop may be used more than one or more other frequency hops. Such unbalanced performance may result in reduced transmission performance.

To improve transmission performance, the transmitting device and/or a receiving device may be configured to determine which frequency hop to apply to a repetition based on an uplink shared channel index. In some cases, the uplink shared channel index may be an uplink shared channel transmission occasion index, where each uplink transmission occasion may be assigned a consecutive index (e.g., 0, 1, 2, etc.). In some cases, the uplink shared channel index may be an uplink shared channel repetition index, where each repetition is assigned a consecutive index (e.g., 0, 1, 2, etc.). The frequency hop determined for each repetition may be based on the index being even or odd. For example, a UE may receive, from a base station, a configuration message configuring the UE to use frequency hopping when transmitting repetitions of an uplink shared channel transmission (e.g., physical uplink shared channel (PUSCH) transmission). The UE, the base station, or both may determine a frequency hop for each repetition of the uplink shared channel transmission. Each frequency hop may be determined based on a corresponding uplink shared channel index for a respective repetition, such as an uplink transmission occasion index, or a repetition index. Determining the frequency hop to apply to each repetition based on the uplink shared channel index may improve uplink transmission performance by increasing the alternation between frequency hops and by balancing the frequency hop usage. The UE may transmit the repetitions of the uplink shared channel transmission using respective frequency hops in accordance with the determination.

Particular aspects of the subject matter described herein may be implemented to realize one or more advantages. The described techniques may support improvements in configuring frequency hop usage for repetitions by improving diversity and reliability, and increasing consistency. As such, supported techniques may include improved network operations and, in some examples, may promote network efficiencies, among other benefits.

Aspects of the disclosure are initially described in the context of wireless communications systems. Aspects are then described with reference to a frequency hopping configuration, frequency hopping procedures, and a process flow. Aspects of the disclosure are further illustrated by and described with reference to apparatus diagrams, system diagrams, and flowcharts that relate to frequency hopping techniques for uplink shared channel repetitions.

FIG. 1 illustrates an example of a wireless communications system 100 that supports frequency hopping techniques for uplink shared channel repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications system 100, a UE 115 may receive, from a base station 105, a control message identifying a frequency hop configuration that configures the UE 115 to use frequency hopping when transmitting repetitions of an uplink shared channel transmission (e.g., PUSCH transmission). The UE 115, the base station 105, or both may determine, based on the UE 115 being configured with the frequency hop configuration, a frequency hop for each repetition of the uplink shared channel transmission. Each frequency hop may be determined based on a corresponding uplink shared channel index, such as an uplink transmission occasion index, or a repetition index, for a respective repetition. For example, the frequency hop used for each repetition may be based on an index of an uplink transmission occasion or an index associated with the repetition. The frequency hop used for each repetition may be based on the index being even or odd. Determining the frequency hop to apply to each repetition based on the uplink shared channel index may improve uplink transmission performance by increasing the alternation between frequency hops and by balancing the frequency hop usage. The UE 115 may transmit the repetitions of the uplink shared channel transmission using respective frequency hops in accordance with the determination and the frequency hop configuration.

Figure 2:
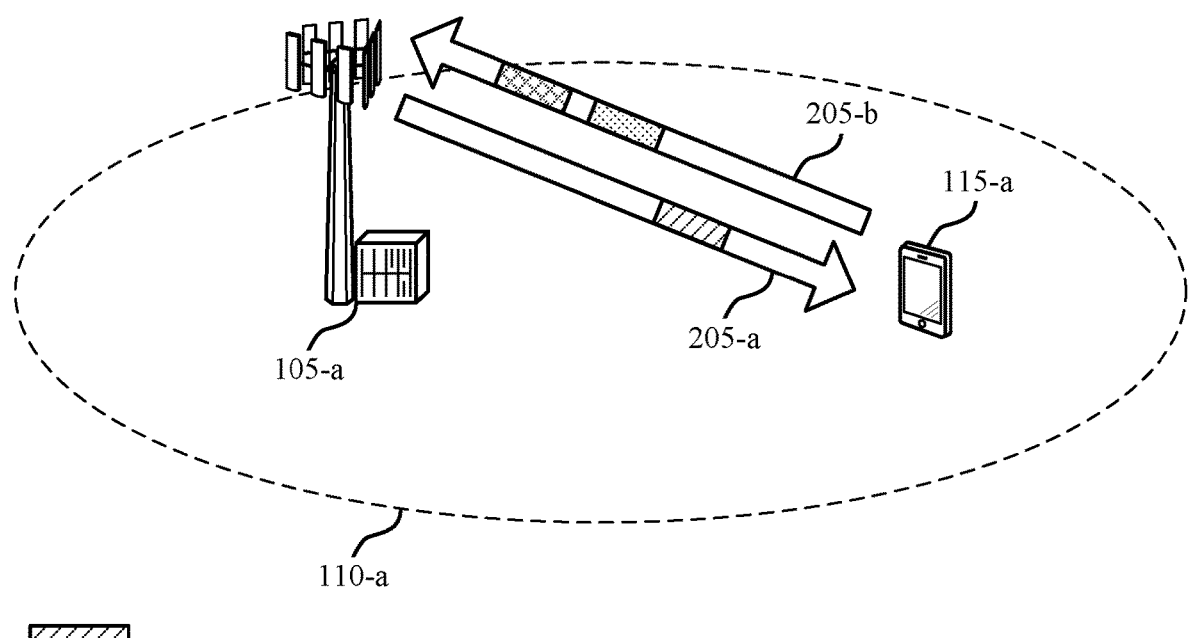
FIG. 2 illustrates an example of a wireless communications system that supports frequency hopping techniques for uplink shared channel repetitions in accordance with aspects of the present disclosure.

FIG. 2 illustrates an example of a wireless communications system 200 that supports frequency hopping techniques for uplink shared channel repetitions in accordance with aspects of the present disclosure. The wireless communications system 200 may include base station 105-*a* and UE 115-*a*, which may be examples of a base station 105 and a UE 115 as described with reference to FIG. 1. Base station 105-*a* may serve a geographic coverage area 110-*a*. In some cases, base station 105-*a* and/or UE 115-*a* may implement a frequency hopping determination procedure to determine a frequency hop 215 to apply to each repetition of an uplink transmission (e.g., uplink control channel transmission, uplink shared channel transmission).

UE 115-*a* may be connected to or otherwise may communicate with base station 105-*a*. For example, base station 105-*a* may transmit one or more downlink signals to UE 115-*a* via communication link 205-*a* (e.g., a downlink communications link, a beam formed communications link) and UE 115-*a* may transmit one or more uplink signals to base station 105-*a* via communication link 205-*b* (e.g., an uplink communications link, a beam formed communications link). In some cases, UE 115-*a* may be configured, such as by base station 105-*a*, to transmit repetitions of an uplink transmission (e.g., a transport block), such as an uplink shared channel transmission (e.g., PUSCH transmission), where UE 115-*a* may transmit the same uplink signal (e.g., the same control information, date information, etc.) in multiple TTIs (e.g., slots). UE 115-*a* may be configured to transmit the repetitions for enhanced coverage as base station 105-*a* is likely to receive at least one of the repetitions. If base station 105-*a* receives multiple repetitions, base station 105-*a* may combine the multiple repetitions to successfully receive and decode the uplink transmission.

In some cases, UE 115-*a* may receive an indication of a number of repetitions for UE 115-*a* to perform, and UE 115-*a* may determine in which slot, for example, to allocate each repetition. In some cases, UE 115-*a* may determine the repetition allocation based on a repetition type. For example, UE 115-*a* may be configured to transmit PUSCH repetitions in accordance with PUSCH repetition type A. To comply with PUSCH repetition type A, UE 115-*a* may allocate each repetition to a consecutive slot (e.g., consecutive adjacent slots), such that UE 115-*a* may repeat the transmission (e.g., a transport block) across consecutive slots by applying the same symbol allocation in each slot. For example, UE 115-*a* may be configured to perform the repetitions using an FDD configuration. In an FDD configuration, UE 115-*a* may be configured to use at least two different frequency bands, where one frequency band may be associated with uplink communications and another frequency band may be associated with downlink communications. As such, in an FDD configuration, UE 115-*a* may perform the repetitions using a first frequency associated with uplink transmissions. While using the first frequency, each slot may be configured for uplink transmissions, whereas in another frequency, the slots may be configured for downlink transmissions. Therefore, UE 115-*a* may allocate each repetition to consecutive uplink configured slots in accordance with PUSCH repetition type A when using an FDD configuration. As such, UE 115-*a* may transmit each repetition, up to the number of configured repetitions, because each repetition is allocated to an uplink configured slot.

However, in some cases, allocating each repetition to a consecutive slot may result in the UE allocating one or more repetitions to TTIs not configured for uplink transmissions. For example, UE 115-*a* may be configured to perform the repetitions using a TDD configuration. In a TDD configuration, UE 115-*a* may be configured to use a single frequency for uplink and downlink communications. As such, each slot in a TDD configuration may be allocated for uplink communications, downlink communications, or may be configured as a special slot (e.g., a slot that may be flexibly configured to perform uplink communications, or downlink communications, or both). In some cases, a special slot may be referred to as a flexible slot. Therefore, UE 115-*a* may allocate each repetition to a consecutive slot but not every repetition may be allocated to a slot that is configured for uplink communications. As such, UE 115-*a* may not be able to transmit each repetition of the number of configured repetitions.

In some implementations, UE 115-*a* may be configured to allocate the number of repetitions in uplink configured slots (e.g., uplink transmission occasions) such as an uplink slot, or a special slot flexibly configured for uplink communications. As such, UE 115-*a* may refrain from allocating a repetition to a downlink configured slot. UE 115-*a* may be configured to allocate the number of repetitions in uplink configured slots while using a TDD configuration or an FDD configuration. As such, UE 115-*a* may transmit each repetition, up to the number of configured repetitions, because each repetition is allocated to an uplink configured slot. In such cases, UE 115-*a* may allocate the repetitions to non-consecutive slots.

In some cases, UE 115-*a* may be configured, by default, to allocate repetitions to consecutive slots, or may be configured, by default to allocate repetitions to uplink configured slots. In some cases, UE 115-*a* may receive aperiodic, semi-persistent, or dynamic signaling via radio resource control (RRC), medium access control (MAC) control element (MAC-CE), or downlink control information (DCI), respectively, that may configure UE 115-*a* to allocate the repetitions to consecutive slots, or may configure UE 115-*a* to allocate the repetitions to uplink configured slots. In some cases, the allocation configuration may be based on UE 115-*a* using a TDD configuration, or an FDD configuration. For example, UE 115-*a* may be configured to allocate repetitions to consecutive slots while using a FDD configuration and may be configured to allocate repetitions to uplink configured slots while using a TDD configuration.

In some cases, UE 115-*a* may be configured to transmit the repetitions using a frequency hopping procedure to further improve transmission performance by providing frequency diversity. For example, frequency hopping may include using different frequency resources (for example, carriers or subcarriers) over one or more time resources (for example, symbols, mini-slots, slots, subframes, or frames). As such, UE 115-*a* may transmit each repetition using one frequency hop 215 of a set of frequency hops. In some wireless communications systems, UE 115-*a* may determine which frequency hop 215 to use for each repetition based on a physical slot number, where the frequency hop 215 may be based on the physical slot number being even or odd. For example, physical slots zero, two, four, six, etc. may be associated with a first frequency hop 215-*a* (e.g., frequency hop 1, a first frequency) and physical slots one, three, five, seven, etc. may be associated with a second frequency hop 215-b (e.g., frequency hop 2, a second frequency). Accordingly, UE 115-a may transmit a repetition allocated to physical slot one using the second frequency hop 215 based on physical slot one being odd, and may transmit a repetition allocated to physical slot two using a first frequency hop 215 based on physical slot one being even.

However, configuring the frequency hops based on the physical slot number may result in an unbalanced usage of frequency hops where the frequency hops may not be alternated and/or one frequency hop 215 may be used more than one or more other frequency hops. For example, UE 115-a may allocate repetitions slot 4, 8, 9, 14, 18, 19, and 24 of a TDD configuration, such as a DDDSUDDSUU configuration, where D may refer to a downlink configured slot, U may refer to uplink configuration slot, and S may refer to a special slot. In such cases, UE 115-a may transmit the repetitions using a first frequency hop 215-a in slots 4, 8, 14, 18, and 24, and may transmit repetitions using a second frequency hop 215-b in slots 9, and 19. As such, UE 115-a may not alternative frequency hops from slot 4 to slot 8 and from slot 14 to slot 18. Further, UE 115-a may transmit five repetitions using the first frequency hop 215-a and transmit two repetitions using the second frequency hop. Such unbalanced, un-alternating, performance may result in reduced transmission performance.

To improve transmission performance, UE 115-a and/or base station 105-a may be configured to determine which frequency hop 215 to apply to a repetition based on an uplink shared channel index. In some cases, the uplink shared channel index may be an uplink shared channel transmission occasion index (e.g., as described with reference to FIG. 4), where each uplink transmission occasion may be assigned an index (e.g., 0, 1, 2, etc.). In some cases, the uplink shared channel index may be an uplink shared channel repetition index (e.g., as described with reference to FIG. 5), where each repetition is assigned an index (e.g., 0, 1, 2, etc.). The frequency hop 215 determined for each repetition may be based on the index being even or odd. For example, UE 115-a may receive, from base station 105-a via communication link 205-a, a configuration message such as in a control message, where the configuration message may include a frequency hopping indication 210. The frequency hopping indication 210 may configure UE 115-a to use frequency hopping when transmitting repetitions of an uplink shared channel transmission (e.g., PUSCH transmission). UE 115-a, base station 105-a, or both may determine a frequency hop 215 for each repetition of the uplink shared channel transmission. Each frequency hop 215 may be determined based on a corresponding uplink shared channel index for a respective repetition, such as an uplink transmission occasion index, or a repetition index. Determining the frequency hop 215 to apply to each repetition based on the uplink shared channel index may improve uplink transmission performance by increasing the alternation between frequency hops and by balancing the frequency hop usage. UE 115-a may transmit the repetitions of the uplink shared channel transmission using respective frequency hops in accordance with the determination and the frequency hop indication. For example, UE 115-a may transmit a first repetition associated with an even index using a first frequency hop 215-a, and a transmit a second repetition associated with an odd index using a second frequency hop 215-b.

Figure 3:
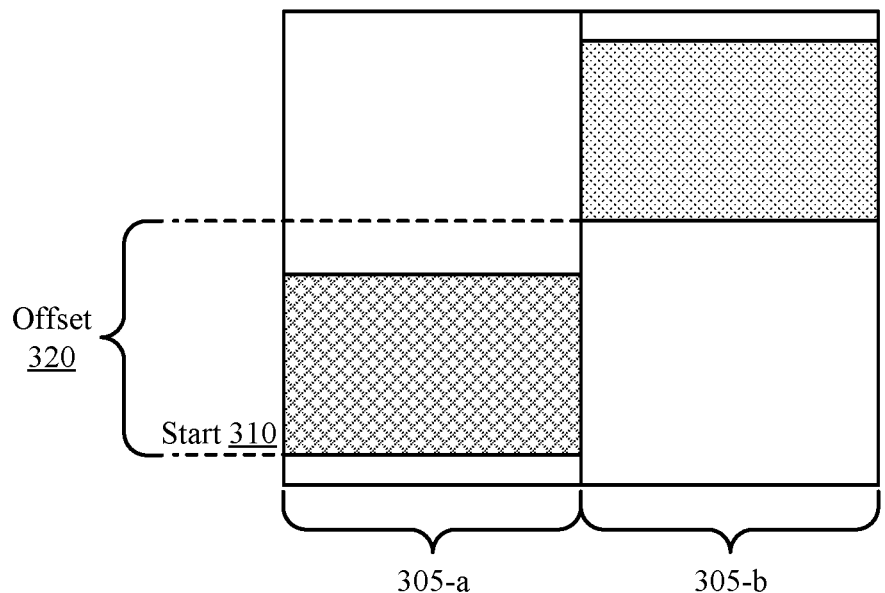
FIG. 3 illustrates an example of a frequency hopping configuration that supports frequency hopping techniques for uplink shared channel repetitions in accordance with aspects of the present disclosure.

FIG. 3 illustrates an example of a frequency hopping configuration 300 that supports frequency hopping techniques for uplink shared channel repetitions in accordance with aspects of the present disclosure. The frequency hopping configuration 300 may be implemented by a base station, or a UE, or both, which may be examples of a base station and a UE as described with reference to FIGS. 1 and 2. In some cases, a base station and/or a UE may implement a frequency hopping determination procedure to determine a frequency hop 315 to apply to each repetition of an uplink transmission (e.g., uplink control channel transmission, uplink shared channel transmission) in accordance with frequency hopping configuration 300.

In some implementations, a transmitting device, such as a UE, may be configured to perform intra-slot frequency hopping in which the UE may use multiple frequency hops within one slot. In some cases, a UE may be configured to perform inter-slot frequency hopping in which the UE may transmit an uplink transmission using one frequency hop 315 per slot over multiple slots. For example, the UE may transmit a first uplink transmission (e.g., a first repetition) in a first slot 305-a using a first frequency hop 315-a and transmit a second uplink transmission (e.g., a second repetition) in second slot 305-b using a second frequency hop.

A frequency hop 315 may be defined as its starting location in the frequency domain. In some cases, the definition of first frequency hop 315-a and the second frequency hop 315-b and the condition under which to use the first frequency hop 315-a and the second frequency hop 315-b may be given by Equation 1.

$$RB_{start}(n_s^u) = \begin{cases} RB_{start} & n_s^u \bmod 2 = 0 \\ (RB_{start} + RB_{Offset}) \bmod N_{BWP}^{size} & n_s^u \bmod 2 = 1 \end{cases} \quad \text{(Equation 1)}$$

$n_s^u$ may refer to the current slot number within a radio frame, where a multi-slot PUSCH transmission may take place, $RB_{start}$ may be the starting resource block within the uplink BWP, as calculated from the resource block assignment information (e.g., of resource allocation type 1), and $RB_{offset}$ may be the frequency offset in resource blocks between the two frequency hops. Accordingly, a repetition transmitted using a first frequency hop 315-a, in a first slot 305-a, may begin at start 310 (e.g., $RB_{start}$) in the frequency domain, and a repetition transmitted using a second frequency hop 315-b, in a second slot 305-b may begin at a location in the frequency domain that is offset 320 from start 310 (e.g., $RB_{start} + RB_{offset}$).

Equation 1 may also determine which frequency hop 315 to use for a repetition based on the slot the repetition is allocated to. For example, $n_s^u$ mod 2=0 may indicate that an even numbered slot may be used to transmit a frequency hop 315 that starts at $RB_{start}$ (e.g., a first frequency hop 315-a), and $n_s^u$ mod 2=1 may indicate that an odd numbered slot may be used to transmit a hop that starts at $RB_{start} + RB_{offset}$ (e.g., a second frequency hop 315-b).

As described herein, configuring the frequency hops based on the physical slot number may result in an unbalanced usage of frequency hops where the frequency hops may not be alternated and/or one frequency hop 315 may be used more than one or more other frequency hops 315. As such, in some cases, a UE may be configured to transmit a first frequency hop 315-a based on an uplink shared channel index being even and transmit a second frequency hop 315-b based on an uplink shared channel index being odd, where $n_s^u$ may instead refer a current index number. Accordingly, the UE may transmit a first repetition associated with an even index using the first frequency hop 315-a in a first slot 305-a at start 310, and transmit a second repetition associated with an odd index using the second frequency hop 315-*b* in a second slot 305-*b* at offset 320 from start 310.

Figure 4:
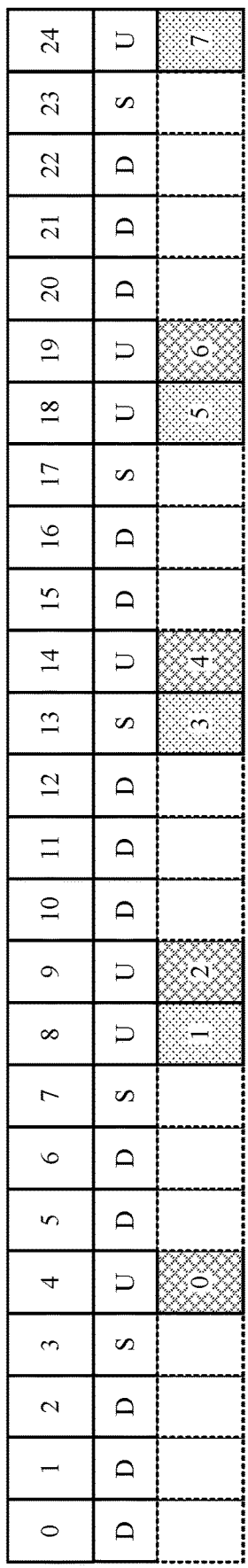
FIGS. 4 and 5 illustrate examples of frequency hopping procedures that support frequency hopping techniques for uplink shared channel repetitions in accordance with aspects of the present disclosure.

FIG. 4 illustrates an example of a frequency hopping procedure 400 that supports frequency hopping techniques for uplink shared channel repetitions in accordance with aspects of the present disclosure. The frequency hopping procedure 400 may be implemented by a base station, or a UE, or both, which may be examples of a base station and a UE as described with reference to FIGS. 1 through 3. In some cases, a base station and/or a UE may implement a frequency hopping determination procedure to determine a frequency hop 415 to apply to each repetition of an uplink transmission (e.g., uplink control channel transmission, uplink shared channel transmission) and the UE may transmit each repetition using a determined frequency hop. Frequency hopping procedure 400 may depict a TDD configuration (e.g., DDDSUDDSUU, where D may refer to a downlink configured slot 405, U may refer to an uplink configured slot 410, and S may refer to a special slot (e.g., special slot 420) that may include Nd downlink symbols at the beginning of the special slot 420, Nu uplink symbols at the end of the special slot 420, and Nf flexible symbols in the middle of special slot 420. Nd, Nu, and Nf may be semi-statically or dynamically configured), but the techniques described herein may not be limited to the depicted slot configuration. Further, the procedure described herein may be performed using a TDD operation (e.g., a TDD operation in an unpaired spectrum) or an FDD operation (e.g., an FDD operation in an unpaired spectrum). Frequency hopping procedure 400 may depict TTIs (e.g., slots, symbols, mini-slots) 0 through 24, but the techniques described herein may be implemented using any number of TTIs.

A UE may be configured to transmit a number of repetitions of an uplink transmission using frequency hopping. For example, the UE may be configured to transmit at least 8 repetitions. In some implementations, the UE may allocate the repetitions in consecutive slots, such that the UE may allocate one repetition to slot 4, one repetition to slot 5, one repetition to slot 6, and so on, up to the number of repetitions regardless of the configuration of the slot. In some implementations, the UE may allocate the repetitions to uplink configured slots (e.g., uplink configured slots 410, or special slots 420 configured for uplink communications), such that the UE may allocate one repetition to slot 4, one repetition to slot 8, one repetition to slot 9, one repetition to slot 13 (e.g., a special slot 420 configured for uplink communications), one repetition to slot 14, and so on, up to the number of repetitions.

As described herein, to improve transmission performance, a UE and/or a base station may be configured to determine which frequency hop 415 to apply to each repetition based on an uplink shared channel index. In some cases, the uplink shared channel index may be an uplink shared channel transmission occasion index. For example, the UE and/or base station may be configured to identify each uplink transmission occasion in a set of resources, such as a set of resources configured according to a TDD configuration, or an FDD configuration. An uplink transmission occasion may refer to an uplink only slot, or a special slot that is configured to include an uplink transmission, such as slot 13. Upon identifying each uplink transmission occasion, the UE may assign on index value to each uplink transmission occasion in a consecutive manner. For example, the UE and/or a base station may be identify that physical slot numbers 4, 8, 9, 13, 14, 18, 19, and 24 are configured for uplink communications. The UE and/or base station may assign an index to each uplink transmission occasions. For example, the UE may assign a 0 to physical slot number 4, a 1 to physical slot number 8, a 2 to physical slot number 9, a 3 to physical slot number 13, a 4 to physical slot number 14, a 5 to physical slot number 18, a 6 to physical slot number 19, and a 7 to physical slot number 24.

The UE may then identify the uplink transmission occasions that have been allocated to a repetition, as repetitions may be allocated to consecutive slots, or to uplink configured slots. In this example, a repetition is allocated to at least physical slot numbers 4, 8, 9, 13, 14, 18, 19, and 24 (e.g., uplink transmission occasions indices 0, 1, 2, 3, 4, 5, 6, 7, respectively). The UE may identify whether each repetition in the uplink transmission occasions is associated with an even uplink transmission occasion index, or an odd uplink transmission occasion index. The UE may determine which frequency hop 415 to use for each repetition based on whether the uplink transmission occasion index is even or odd. For example, the UE may use a first frequency hop 415-*a* for repetitions associated with an even uplink transmission occasion index, and use a second frequency hop 415-*b* for repetitions associated with an odd uplink transmission occasion index.

For example, the UE may identify that the repetitions allocated to physical slots 4, 9, 14, and 19 are associated with uplink transmission occasion indices 0, 2, 4, and 6, respectively which are even indices. As such, the UE may use a first frequency hop 415-*a* for the repetitions allocated to physical slots 4, 9, 14, and 19. The UE may identify that the repetitions allocated to physical slots 8, 13, 18, and 24 are associated with uplink transmission occasion indices 1, 3, 5, and 7, respectively, which are odd indices. As such, the UE may use a second frequency hop 415-*b* for transmitting the repetitions allocated to physical slots 8, 13, 18, and 24. The UE may transmit the repetitions in physical slots 4, 8, 9, 13, 14, 18, 19, and 24 using the frequency hop 415 determined for each repetition based on the uplink transmission occasion index.

Figure 5:
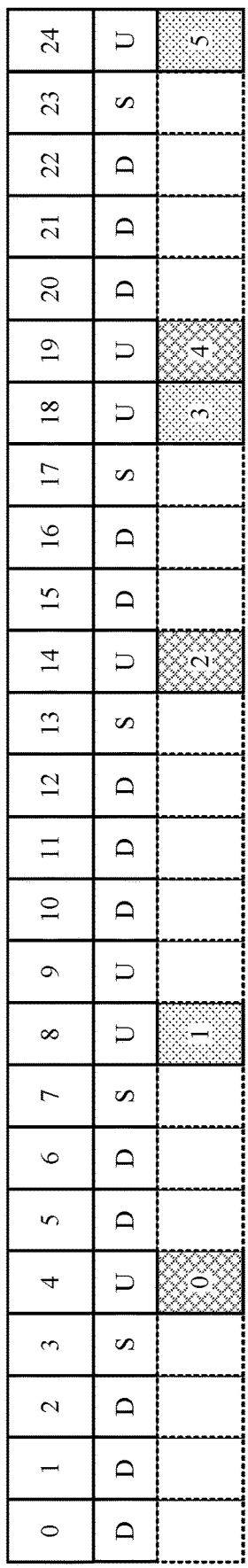

FIG. 5 illustrates an example of a frequency hopping procedure 500 that supports frequency hopping techniques for uplink shared channel repetitions in accordance with aspects of the present disclosure. The frequency hopping procedure 500 may be implemented by a base station, or a UE, or both, which may be examples of a base station and a UE as described with reference to FIGS. 1 through 4. In some cases, a base station and/or a UE may implement a frequency hopping determination procedure to determine a frequency hop 515 to apply to each repetition of an uplink transmission (e.g., uplink control channel transmission, uplink shared channel transmission) and the UE may transmit each repetition using a determined frequency hop. Frequency hopping procedure 500 may depict a TDD configuration (e.g., DDDSUDDSUU, where D may refer to a downlink configured slot 505, U may refer to an uplink configured slot 510, and S may refer to a special slot (e.g., special slot 520) that may include Nd downlink symbols at the beginning of the special slot 520, Nu uplink symbols at the end of the special slot 520, and Nf flexible symbols in the middle of special slot 520. Nd, Nu, and Nf may be semi-statically or dynamically configured), but the techniques described herein may not be limited to the depicted slot configuration. Further, the procedure described herein may be performed using a TDD operation (e.g., a TDD operation in an unpaired spectrum) or an FDD operation (e.g., an FDD operation in an unpaired spectrum). Frequency hopping procedure 500 may depict TTIs (e.g., slots, symbols, mini-slots) 0 through 24, but the techniques described herein may be implemented using any number of TTIs.

A UE may be configured to transmit a number of repetitions of an uplink transmission using frequency hopping. For example, the UE may be configured to transmit at least 6 repetitions. In some implementations, the UE may allocate the repetitions in consecutive slots, such that the UE may allocate one repetition to slot 4, one repetition to slot 5, one repetition to slot 6, and so on, up to the number of repetitions regardless of the configuration of the slot. In some implementations, the UE may allocate the repetitions to uplink configured slots (e.g., uplink configured slots 510, or special slots 520 configured for uplink communications), such that the UE may allocate one repetition to slot 4, one repetition to slot 8, one repetition to slot 9, one repetition to slot 14, and so on, up to the number of repetitions.

As described herein, to improve transmission performance, a UE and/or a base station may be configured to determine which frequency hop 515 to apply to a repetition based on an uplink shared channel index. In some cases, the uplink shared channel index may be an uplink repetition index. The UE and/or base station may assign a repetition index to each repetition that the UE may transmit in a consecutive manner. For example, if the UE allocates the repetitions to consecutive slots, the UE may assign a repetition index to the repetitions allocated in uplink configured slots, rather than all of the repetitions. For example, if UE allocates a repetition to physical slot number 4 through 6, the UE may assign a repetition index to only the repetition allocated to physical slot 4 because physical slot 4 is the only uplink configured slot of slots 4 through 6. In another example, if the UE allocated the repetitions to uplink configured slots, then the UE may assign a repetition to each of the repetitions as the UE may transmit each of the repetitions allocated to the uplink configured slots.

Accordingly, the UE may determine that repetitions are allocated to physical slots 4, 8, 14, 18, 19, and 24 which are configured for uplink communications. As such, the UE may assign a repetition index of 0 to the repetition allocated to physical slot 4, a repetition index of 1 to the repetition allocated to physical slot 8, a repetition index of 2 to the repetition allocated to physical slot 14, a repetition index of 3 to the repetition allocated to physical slot 18, a repetition index of 4 to the repetition allocated to physical slot 19, and a repetition index of 5 to the repetition allocated to physical slot 24.

The UE may identify whether each repetition is associated with an even repetition index, or an odd repetition index. The UE may determine which frequency hop 515 to use based on whether the repetition index is even or odd. For example, the UE may use a first frequency hop 515-a for repetitions associated with an even repetition index, and use a second frequency hop 515-b for repetitions associated with an odd repetition index.

For example, the UE may identify that the repetitions allocated to physical slots 4, 14, and 19 are associated with repetition indices 0, 2, and 4, respectively, which are even indices. As such, the UE may use a first frequency hop 515-a for the repetitions allocated to physical slots 4, 14, and 19. The UE may identify that the repetitions allocated to physical slots 8, 18, and 24 are associated with repetition indices 1, 3, and 5, respectively, which are odd indices. As such, the UE may use a second frequency hop 515-b for transmitting the repetitions allocated to physical slots 8, 18, and 24. The UE may transmit the repetitions in physical slots 4, 8, 14, 18, 19, and 24 using the frequency hop 515 determined for each repetition based on the uplink transmission occasion index.

As the index is associated with the repetition, rather than a physical location, the transmission configuration may be dynamically updated. For example, the UE may have originally allocate a repetition to physical slot 9 which is an uplink configured slot. This repetition may have been the third consecutive repetition, and as such, may have been assigned a repetition index of 2. The UE therefore would have used the first frequency hop 515-a to transmit this repetition. However, in a slot prior to physical slot 9, the UE may receive a dynamic message (e.g., and DCI message) indicating that physical slot 9 is to be used for an different uplink transmission than the repetition, such as an uplink transmission of higher priority than the repetition. As such, the repetition originally allocated to physical slot 9 may be at least partially canceled. If the UE determines to cancel the repetition in physical slot 9, then the new third consecutive repetition may be located in physical slot 14. As such, the repetition located in physical slot 14 may be assigned a repetition index of 2, and may be transmitted using a first frequency hop 515-a. As such, the frequency hops may continue to alternate, even in the case of a canceled repetition.

In another example, one or more repetitions may be canceled. For example, the UE may receive a downlink pre-emption indication (DLPI) that may indicate that one or more resources in a slot are preempted. In another example, the UE may receive an uplink cancelation indication (ULCI) that may indicate that one or more resources of an ongoing transmission are canceled, such as one or more resources associated with a future repetition. The future repetition may be canceled or partially canceled so the UE may transmit or receive another transmission, such as a higher priority transmission. In some cases, the UE may support dual active protocol stack (DAPS) in which the UE may simultaneously connect to a source base station (e.g., source cell) and a target base station (e.g., target cell). The UE may support DAPS for intra-frequency handover, intra-band inter-frequency handover, or inter-band inter-frequency handover, or a combination thereof. In some cases, the UE may be scheduled to transmit simultaneous uplink transmissions to each of the source base station and the target base station. However, in some cases, the UE may have to cancel one of the uplink transmissions. For DAPS handover that is not intra-frequency, if the UE indicates support of ul-Trans CancellationDAPS, and the UE does not indicate a capability for power sharing between the source base station and the target master cell group (MCG) in DAPS handover or the UE is not provided with uplinkPowerSharingDAPS-Mode, and the UE has uplink transmissions scheduled to the target base station and the source base station in overlapping time resources, the UE may transmit only the uplink transmission to the target base station and cancel the uplink transmission to the source base station. For intra-frequency DAPS handover, if the UE has uplink transmissions scheduled to the target base station and the source base station in overlapping time resources, the UE may transmit only the uplink transmission to the target base station and cancel the uplink transmission to the source base station. As such, for an uplink transmission occasion or slot, ULCI, DAPs handover, or some other event, may cancel at least a portion of an uplink transmission (e.g., a repetition). If cancellation occurs early in a slot such that a large portion of the uplink transmission is canceled, then the uplink transmission may not be useful. If cancellation occurs later in a slot such that a small portion of the uplink transmission is canceled, then the uplink transmission may be useful.

For example, the UE may have scheduled a repetition in slot 8, and the UE may determine to transmit the repetition using a second frequency hop 515-b based on the uplink shared channel index (e.g., uplink transmission occasion index, uplink repetition index) being odd. However, the UE may receive an indication (e.g., a dynamic indication in DCI) prior to slot 8, that indicates that a higher priority transmission is scheduled in slot 8 that at least partially overlaps with the repetition in slot 8. As such, at least the portion (e.g., symbols) of the repetition that overlaps with the higher priority transmission may be canceled. In some implementations, the UE may determine the amount of the repetition that is canceled (e.g., a number of symbols, a duration of time) and/or the amount of the repetition remaining (e.g., the non-canceled portion of the repetition). In some implementations, the UE may compare the remaining amount to a first threshold, where the UE may be preconfigured with the first threshold, or receive signaling (e.g., RRC, DCI, MAC-CE) indicating the first threshold. In some cases, if the remaining amount is below the first threshold, then the UE may determine to transmit the remaining portion (e.g., the non-canceled portion) of the repetition using the frequency hop that was originally assigned to the repetition (e.g., the second frequency hop 515-b). In some other cases, if the remaining amount is below the first threshold, then the UE may determine to transmit the remaining portion of the repetition using the frequency hop 515 used for the previous repetition, such as the first frequency hop 515-a used to transmit the repetition in slot 4. In some cases, if the remaining amount is less the first threshold, then the UE may determine to refrain from transmitting the repetition.

In some other implementations, the UE may compare the canceled amount to a second threshold (e.g., different than the first threshold), where the UE may be preconfigured with the second threshold, or receive signaling (e.g., RRC, DCI, MAC-CE) indicating the second threshold. In some cases, if the canceled amount is above the second threshold, then the UE may determine to transmit the remaining (e.g., non-canceled) portion of the repetition using the frequency hop originally assigned to the repetition (e.g., the second frequency hop 515-b). In some other cases, if the canceled amount is above the second threshold, then the UE may determine to transmit the remaining portion of the repetition using the frequency hop 515 used for the previous repetition, such as the first frequency hop 515-a used to transmit the repetition in slot 4. In some cases, if the canceled amount is above the second threshold, then the UE may determine to refrain from transmitting the repetition.

In some cases, a UE may be configured, by default, to determine frequency hops 515 based on an uplink transmission occasion index, or may be configured, by default to determine frequency hops 515 based on a repetition index. In some cases, the UE may receive aperiodic, semi-persistent, or dynamic signaling via RRC, MAC-CE, or DCI, respectively, that may configure UE 115-a to use the uplink transmission occasion index, or the repetition index for determining frequency hops 515.

Figure 6:
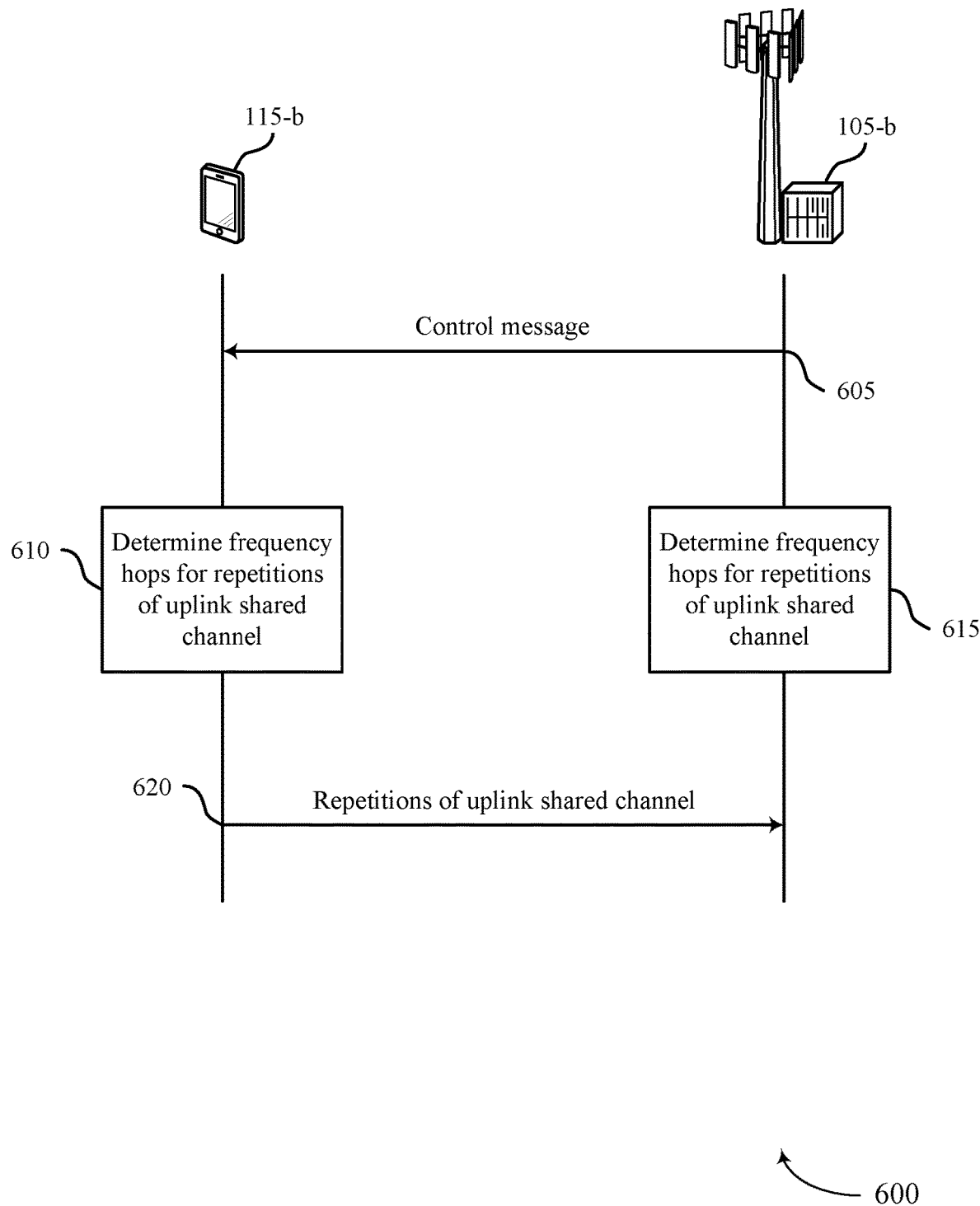
FIG. 6 illustrates an example of a process flow that supports frequency hopping techniques for uplink shared channel repetitions in accordance with aspects of the present disclosure.

FIG. 6 illustrates an example of a process flow 600 that supports frequency hopping techniques for uplink shared channel repetitions in accordance with aspects of the present disclosure. The process flow 600 may illustrate an example frequency hopping determination procedure for transmitting one or more repetitions of a transmission. For example, base station 105-b and/or UE 115-b may implement a frequency hopping determination procedure to determine a frequency hop to apply to each repetition of an uplink transmission (e.g., uplink control channel transmission, uplink shared channel transmission). Base station 105-b and UE 115-b may be examples of the corresponding wireless devices described with reference to FIGS. 1 through 5. Alternative examples of the following may be implemented, where some steps are performed in a different order than described or are not performed at all. In some cases, steps may include additional features not mentioned below, or further steps may be added.

At 605, UE 115-b may receive a control message (e.g., physical downlink control channel (PDCCH) message, DCI message, RRC message, MAC-CE message) identifying a frequency hop configuration that configures the UE to use frequency hopping when transmitting repetitions of an uplink shared channel (e.g., PUSCH).

In some cases, UE 115-b may receive, such as from base station 105-b, a configuration message indicating a counting configuration for allocating each repetition of the uplink shared channel to a respective slot of a plurality of slots. UE 115-b may receive an indication of a number of repetitions to transmit for the uplink shared channel, and allocate each repetition, up to the number of repetitions, to the plurality of slots in accordance with the counting configuration. In an example, UE 115-b may allocate each repetition, up to the number of repetitions, to uplink configured slots only, where an uplink configured slot is an uplink slot or a special slot allocated for uplink transmissions, and transmit each repetition that is allocated to the uplink configured slots.

In some cases, UE 115-b may identify a plurality of repetitions, where each repetition of the plurality of repetitions is allocated to an uplink configured slot, where the uplink configured slot is an uplink slot or a special slot allocated for uplink transmissions. UE 115-b may assign a first uplink shared channel index to a first repetition of the plurality of repetitions, and determine a first frequency hop for the first repetition based on the first uplink shared channel index being even. UE 115-b may assign a second uplink shared channel index to a second repetition of the plurality of repetitions, and determine a second frequency hop for the second repetition based on the second uplink shared channel index being odd.

In some implementations, UE 115-b may identify a plurality of uplink transmission occasions, and assign each uplink transmission occasion of the plurality of uplink transmission occasions an uplink shared channel index. In some cases, determining the frequency hop for each repetition may be based on the uplink shared channel index assigned to each uplink transmission occasion being even or odd. In an example, UE 115-b may assign a first uplink shared channel index to a first uplink transmission occasion of the plurality of uplink transmission occasions, where a repetition may be allocated to the first uplink transmission occasion. UE 115-b may determine a first frequency hop for the repetition allocated to the first uplink transmission occasion based on the first uplink shared channel index being even. In an example, UE 115-b may assign a second uplink shared channel index to a second uplink transmission occasion of the plurality of uplink transmission occasions, where a repetition may be allocated to the second uplink transmission occasion. UE 115-b may determine a second frequency hop for the repetition allocated to the second uplink transmission occasion based on the second uplink shared channel index being odd.

At 610, UE 115-b may determine, based on UE 115-b being configured with the frequency hop configuration, a frequency hop for each repetition of the uplink shared channel. Each frequency hop may be determined based on a corresponding uplink shared channel index for a respective repetition.

At 615, base station 105-b may determine, based on UE 115-b being configured with the frequency hop configuration, a frequency hop for each repetition of the uplink shared channel. Each frequency hop may be determined based on a corresponding uplink shared channel index for a respective repetition.

In some implementations, UE 115-b and/or base station 105-b may determine the frequency hop for a selected repetition of the uplink shared channel based on an uplink shared channel transmission occasion index corresponding to the selected repetition, where the uplink shared channel transmission occasion index is the uplink shared channel index. In some implementations, UE 115-b and/or base station 105-b may determine the frequency hop for a selected repetition of the uplink shared channel based on an uplink shared channel repetition index corresponding to the selected repetition, where the uplink shared channel repetition index is the uplink shared channel index. In some implementations, UE 115-b and/or base station 105-b may determine the frequency hop for a selected repetition of the uplink shared channel based on a logical index corresponding each of the available slots for uplink transmission, where the logical index is the uplink shared channel index.

At 620, UE 115-b may transmit, to base station 105-b, the repetitions of the uplink shared channel using respective frequency hops in accordance with the determination and the frequency hop configuration in available slots. In some cases, UE 115-b may transmit each repetition of the uplink shared channel in a same starting location in each available slot of the available slots, where each repetition may be transmitted for a same duration. UE 115-b may transmit the repetitions of the uplink shared channel in accordance with a time division duplexing frame structure or a frequency division duplexing frame structure.

In some cases, UE 115-b may receive an additional message indicating that at least a portion of a repetition allocated to a slot is canceled, determine that a number of symbols occupied by the repetition is below a threshold (e.g., a preconfigured threshold, a predefined threshold, a threshold signaled to UE 115-b), and UE 115-b may transmit the repetition using a frequency hop associated with a previous repetition.

Figure 7:
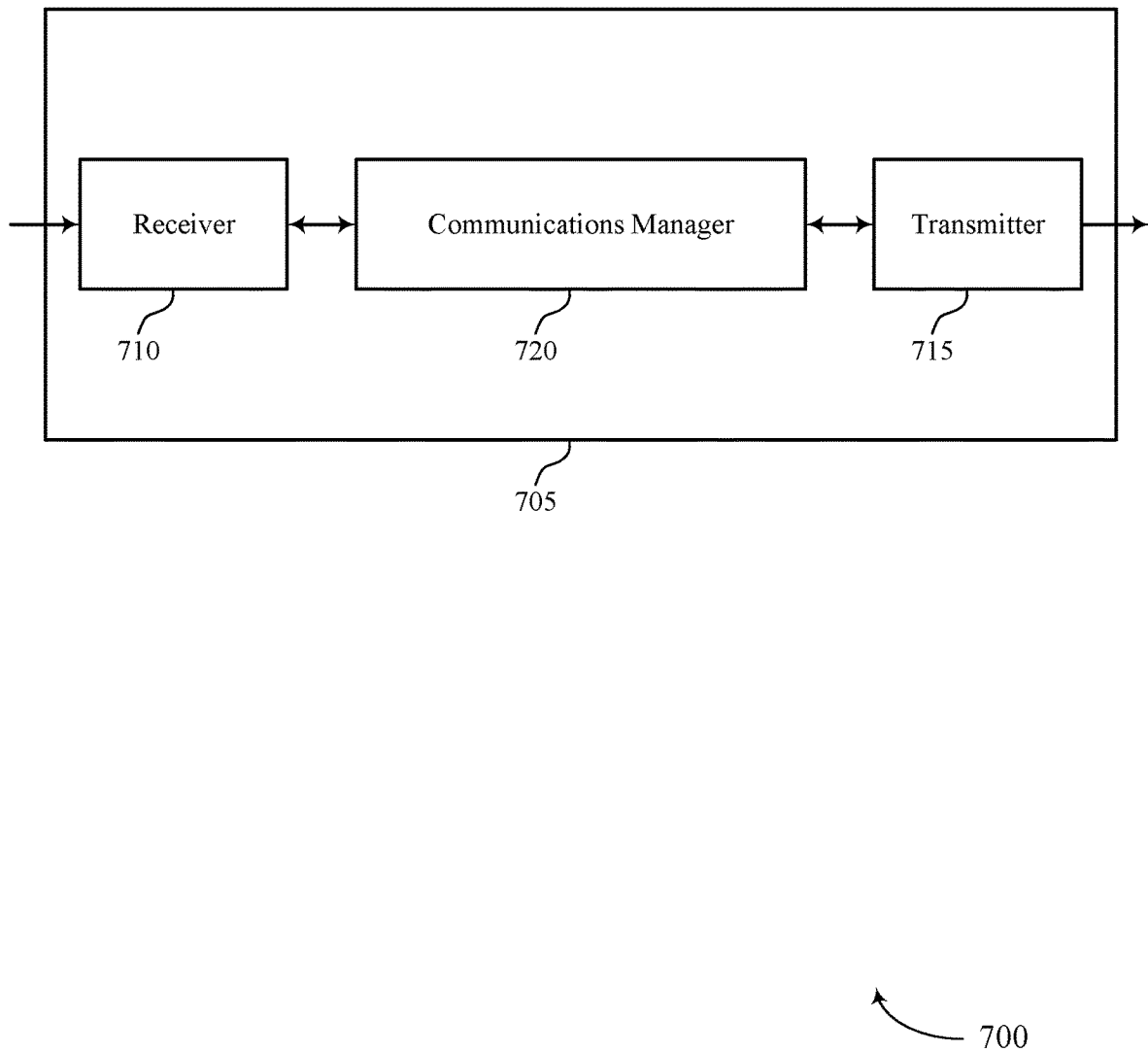
FIGS. 7 and 8 show block diagrams of devices that support frequency hopping techniques for uplink shared channel repetitions in accordance with aspects of the present disclosure.

FIG. 7 shows a block diagram 700 of a device 705 that supports frequency hopping techniques for uplink shared channel repetitions in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to frequency hopping techniques for uplink shared channel repetitions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to frequency hopping techniques for uplink shared channel repetitions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of frequency hopping techniques for uplink shared channel repetitions as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving a control message identifying a frequency hop configuration that configures the UE to use frequency hopping when transmitting repetitions of an uplink shared channel. The communications manager 720 may be configured as or otherwise support a means for determining, based on the UE being configured with the frequency hop configuration, a frequency hop for each repetition of the uplink shared channel, each frequency hop determined based on a corresponding uplink shared channel index for a respective repetition. The communications manager 720 may be configured as or otherwise support a means for transmitting the repetitions of the uplink shared channel using respective frequency hops in accordance with the determination and the frequency hop configuration in slots available for uplink shared channel transmissions.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources.

Figure 8:
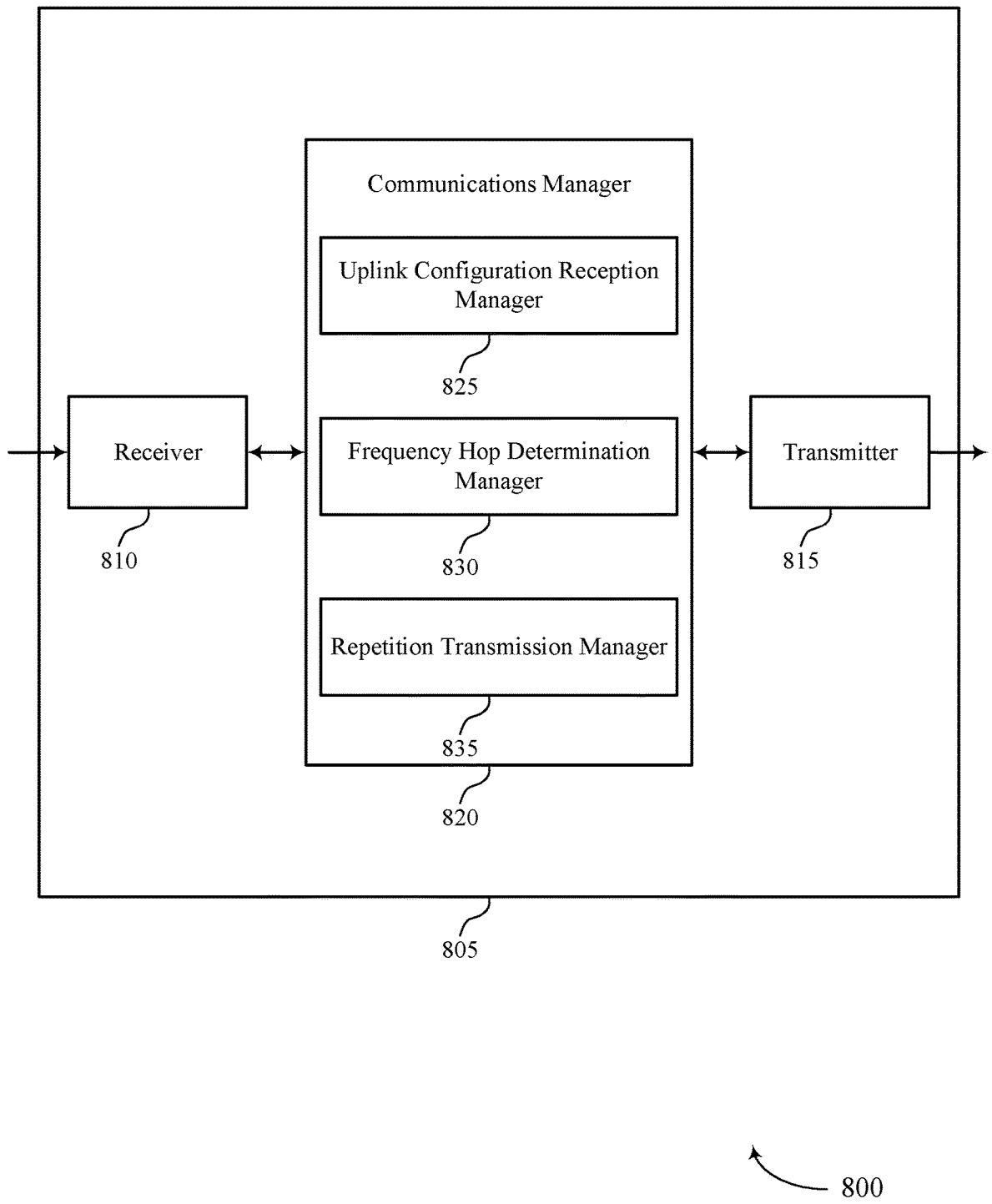

FIG. 8 shows a block diagram 800 of a device 805 that supports frequency hopping techniques for uplink shared channel repetitions in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to frequency hopping techniques for uplink shared channel repetitions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to frequency hopping techniques for uplink shared channel repetitions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of frequency hopping techniques for uplink shared channel repetitions as described herein. For example, the communications manager 820 may include an uplink configuration reception manager 825, a frequency hop determination manager 830, a repetition transmission manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The uplink configuration reception manager 825 may be configured as or otherwise support a means for receiving a control message identifying a frequency hop configuration that configures the UE to use frequency hopping when transmitting repetitions of an uplink shared channel. The frequency hop determination manager 830 may be configured as or otherwise support a means for determining, based on the UE being configured with the frequency hop configuration, a frequency hop for each repetition of the uplink shared channel, each frequency hop determined based on a corresponding uplink shared channel index for a respective repetition. The repetition transmission manager 835 may be configured as or otherwise support a means for transmitting the repetitions of the uplink shared channel using respective frequency hops in accordance with the determination and the frequency hop configuration in slots available for uplink shared channel transmissions.

Figure 9:
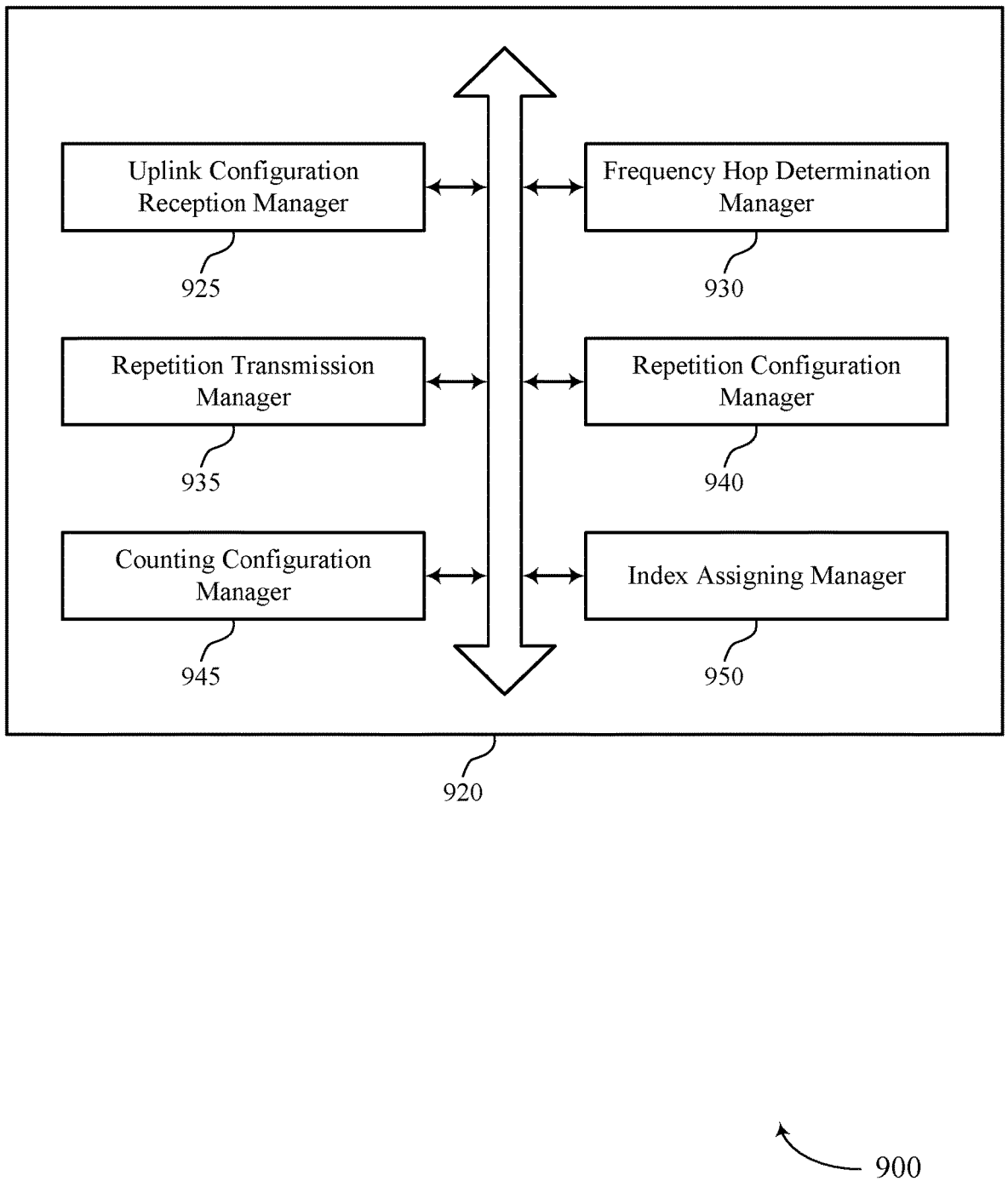
FIG. 9 shows a block diagram of a communications manager that supports frequency hopping techniques for uplink shared channel repetitions in accordance with aspects of the present disclosure.

FIG. 9 shows a block diagram 900 of a communications manager 920 that supports frequency hopping techniques for uplink shared channel repetitions in accordance with aspects of the present disclosure. The communications manager 920 may be an example of aspects of a communications manager 720, a communications manager 820, or both, as described herein. The communications manager 920, or various components thereof, may be an example of means for performing various aspects of frequency hopping techniques for uplink shared channel repetitions as described herein. For example, the communications manager 920 may include an uplink configuration reception manager 925, a frequency hop determination manager 930, a repetition transmission manager 935, a repetition configuration manager 940, a counting configuration manager 945, an index assigning manager 950, or any combination thereof. Each of these components may communicate, directly or indirectly, with one another (e.g., via one or more buses).

The communications manager 920 may support wireless communications at a UE in accordance with examples as disclosed herein. The uplink configuration reception manager 925 may be configured as or otherwise support a means for receiving a control message identifying a frequency hop configuration that configures the UE to use frequency hopping when transmitting repetitions of an uplink shared channel. The frequency hop determination manager 930 may be configured as or otherwise support a means for determining, based on the UE being configured with the frequency hop configuration, a frequency hop for each repetition of the uplink shared channel, each frequency hop determined based on a corresponding uplink shared channel index for a respective repetition. The repetition transmission manager 935 may be configured as or otherwise support a means for transmitting the repetitions of the uplink shared channel using respective frequency hops in accordance with the determination and the frequency hop configuration in slots available for uplink shared channel transmissions.

In some examples, to support determining the frequency hop for each repetition of the uplink shared channel, the frequency hop determination manager 930 may be configured as or otherwise support a means for determining the frequency hop for a selected repetition of the uplink shared channel based on an uplink shared channel transmission occasion index corresponding to the selected repetition, where the uplink shared channel transmission occasion index is the uplink shared channel index and pertains to a slot available for uplink shared channel transmissions.

In some examples, to support determining the frequency hop for each repetition of the uplink shared channel, the frequency hop determination manager 930 may be configured as or otherwise support a means for determining the frequency hop for a selected repetition of the uplink shared channel based on an uplink shared channel repetition index corresponding to the selected repetition, where the uplink shared channel repetition index is the uplink shared channel index.

In some examples, to support determining the frequency hop for each repetition of the uplink shared channel, the frequency hop determination manager 930 may be configured as or otherwise support a means for determining the frequency hop for a selected repetition of the uplink shared channel based on a logical index sequentially indexing each of the slots available for uplink shared channel transmissions, where the logical index is the uplink shared channel index.

In some examples, the uplink configuration reception manager 925 may be configured as or otherwise support a means for receiving an additional message indicating that at least a portion of a repetition allocated to a slot is canceled. In some examples, the repetition configuration manager 940 may be configured as or otherwise support a means for determining that a number of symbols occupied by the repetition is below a threshold. In some examples, the repetition transmission manager 935 may be configured as or otherwise support a means for transmitting the repetition using a frequency hop associated with a previous repetition.

In some examples, the counting configuration manager 945 may be configured as or otherwise support a means for receiving a configuration message indicating a counting configuration for allocating each repetition of the uplink shared channel to a respective slot of a set of multiple slots. In some examples, the uplink configuration reception manager 925 may be configured as or otherwise support a means for receiving an indication of a number of repetitions to transmit for the uplink shared channel. In some examples, the repetition configuration manager 940 may be configured as or otherwise support a means for allocating each repetition, up to the number of repetitions, to the set of multiple slots in accordance with the counting configuration.

In some examples, to support allocating each repetition to the slot, the repetition configuration manager 940 may be configured as or otherwise support a means for allocating each repetition, up to the number of repetitions, to uplink configured slots only, where an uplink configured slot is an uplink slot or a special slot allocated for uplink transmissions. In some examples, to support allocating each repetition to the slot, the repetition transmission manager 935 may be configured as or otherwise support a means for transmitting each repetition that is allocated to the uplink configured slots.

In some examples, to support allocating each repetition, the repetition configuration manager 940 may be configured as or otherwise support a means for identifying a set of multiple repetitions, where each repetition of the set of multiple repetitions is allocated to an uplink configured slot, where the uplink configured slot is an uplink slot or a special slot available for uplink shared channel transmissions.

In some examples, the index assigning manager 950 may be configured as or otherwise support a means for assigning a first uplink shared channel index to a first repetition of the set of multiple repetitions. In some examples, the frequency hop determination manager 930 may be configured as or otherwise support a means for determining a first frequency hop for the first repetition based on the first uplink shared channel index being even.

In some examples, the index assigning manager 950 may be configured as or otherwise support a means for assigning a second uplink shared channel index to a second repetition of the set of multiple repetitions. In some examples, the frequency hop determination manager 930 may be configured as or otherwise support a means for determining a second frequency hop for the second repetition based on the second uplink shared channel index being odd.

In some examples, the index assigning manager 950 may be configured as or otherwise support a means for identifying a set of multiple uplink transmission occasions. In some examples, the index assigning manager 950 may be configured as or otherwise support a means for assigning each uplink transmission occasion of the set of multiple uplink transmission occasions an uplink shared channel index.

In some examples, determining the frequency hop for each repetition is based on the uplink shared channel index assigned to each uplink transmission occasion being even or odd.

In some examples, the index assigning manager 950 may be configured as or otherwise support a means for assigning a first uplink shared channel index to a first uplink transmission occasion of the set of multiple uplink transmission occasions, a repetition allocated to the first uplink transmission occasion. In some examples, the frequency hop determination manager 930 may be configured as or otherwise support a means for determining a first frequency hop for the repetition allocated to the first uplink transmission occasion based on the first uplink shared channel index being even.

In some examples, the index assigning manager 950 may be configured as or otherwise support a means for assigning a second uplink shared channel index to a second uplink transmission occasion of the set of multiple uplink transmission occasions, a repetition allocated to the second uplink transmission occasion. In some examples, the frequency hop determination manager 930 may be configured as or otherwise support a means for determining a second frequency hop for the repetition allocated to the second uplink transmission occasion based on the second uplink shared channel index being odd.

In some examples, to support transmitting the repetitions of the uplink shared channel, the repetition configuration manager 940 may be configured as or otherwise support a means for transmitting each repetition of the uplink shared channel in a same starting location in each of a plurality of uplink configured slots, where each repetition is transmitted for a same duration.

In some examples, the UE transmits the repetitions of the uplink shared channel in accordance with a time division duplexing frame structure or a frequency division duplexing frame structure.

Figure 10:
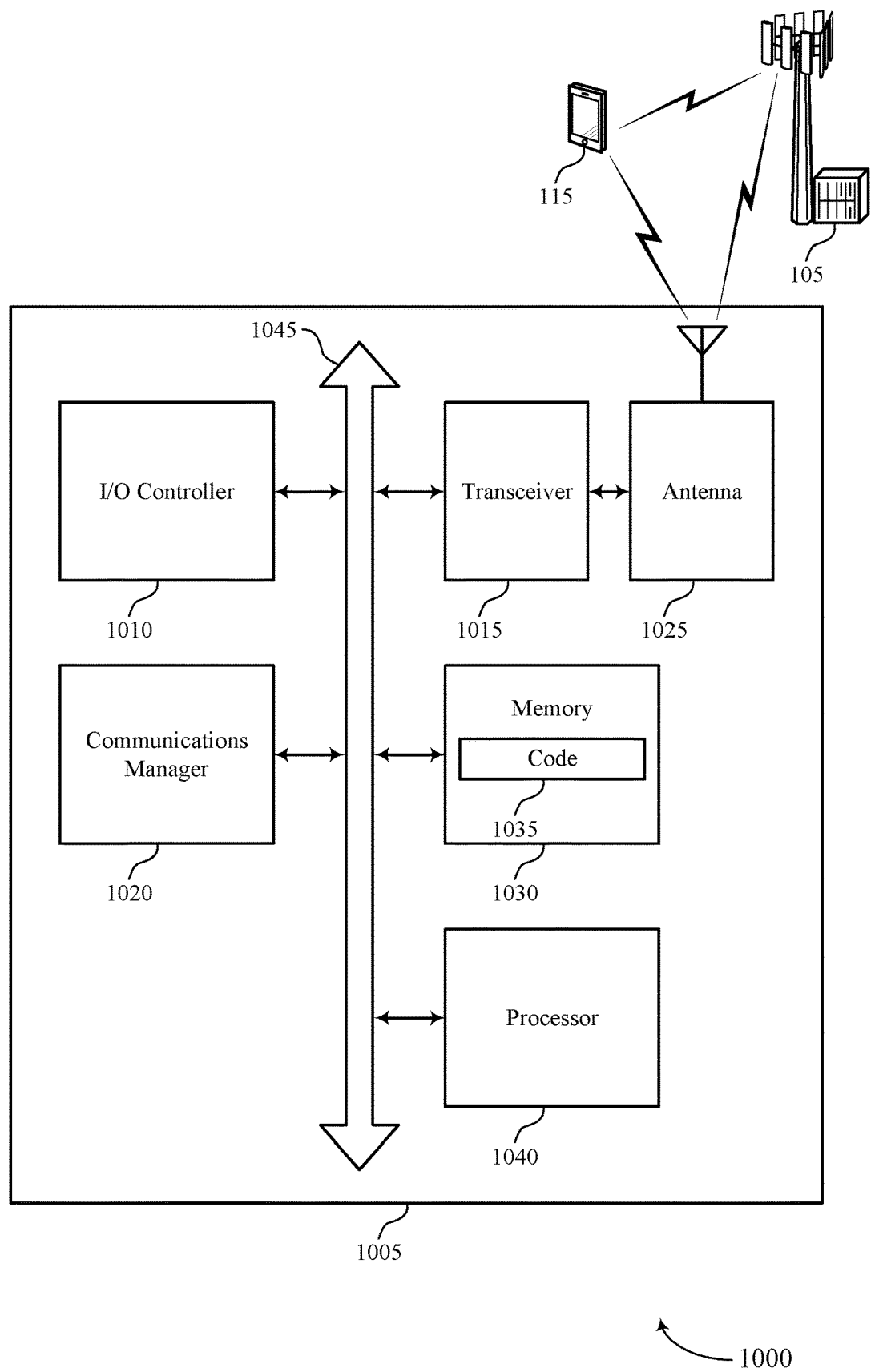
FIG. 10 shows a diagram of a system including a device that supports frequency hopping techniques for uplink shared channel repetitions in accordance with aspects of the present disclosure.

FIG. 10 shows a diagram of a system 1000 including a device 1005 that supports frequency hopping techniques for uplink shared channel repetitions in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting frequency hopping techniques for uplink shared channel repetitions). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving a control message identifying a frequency hop configuration that configures the UE to use frequency hopping when transmitting repetitions of an uplink shared channel. The communications manager 1020 may be configured as or otherwise support a means for determining, based on the UE being configured with the frequency hop configuration, a frequency hop for each repetition of the uplink shared channel, each frequency hop determined based on a corresponding uplink shared channel index for a respective repetition. The communications manager 1020 may be configured as or otherwise support a means for transmitting the repetitions of the uplink shared channel using respective frequency hops in accordance with the determination and the frequency hop configuration in slots available for uplink shared channel transmissions.

By including or configuring the communications manager 1020 in accordance with examples as described herein, the device 1005 may support techniques for improved communication reliability, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of frequency hopping techniques for uplink shared channel repetitions as described herein, or the processor 1040 and the memory 1030 may be otherwise configured to perform or support such operations.

Figure 11:
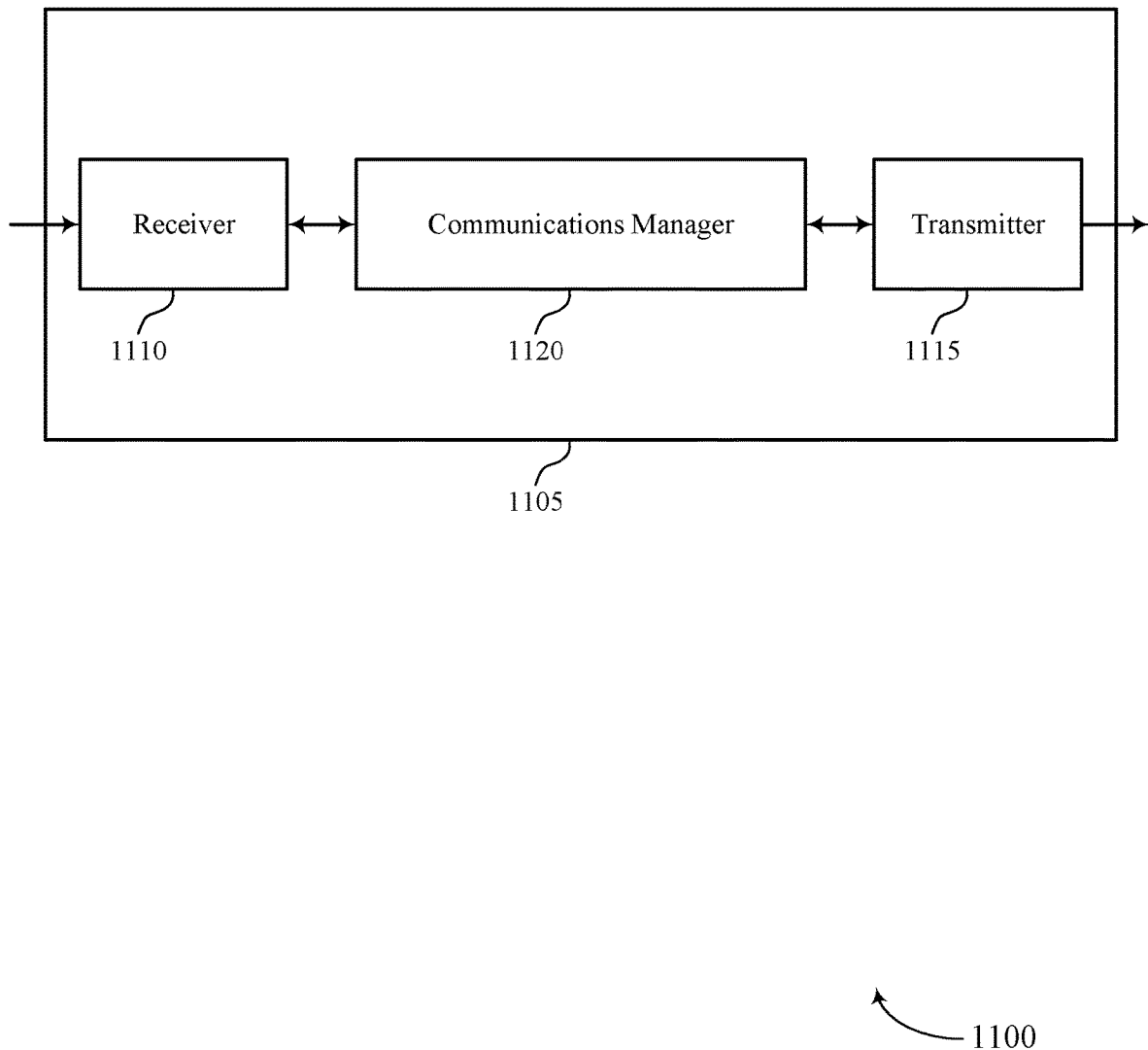
FIGS. 11 and 12 show block diagrams of devices that support frequency hopping techniques for uplink shared channel repetitions in accordance with aspects of the present disclosure.

FIG. 11 shows a block diagram 1100 of a device 1105 that supports frequency hopping techniques for uplink shared channel repetitions in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to frequency hopping techniques for uplink shared channel repetitions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to frequency hopping techniques for uplink shared channel repetitions). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of frequency hopping techniques for uplink shared channel repetitions as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting a control message identifying a frequency hop configuration that configures a UE to use frequency hopping when transmitting repetitions of an uplink shared channel. The communications manager 1120 may be configured as or otherwise support a means for determining, based on the UE being configured with the frequency hop configuration, a frequency hop for each repetition of the uplink shared channel, each frequency hop determined based on a corresponding uplink shared channel index for a respective repetition. The communications manager 1120 may be configured as or otherwise support a means for receiving the repetitions of the uplink shared channel using respective frequency hops in accordance with the determination and the frequency hop configuration in slots available for uplink shared channel transmissions.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of communication resources.

Figure 12:
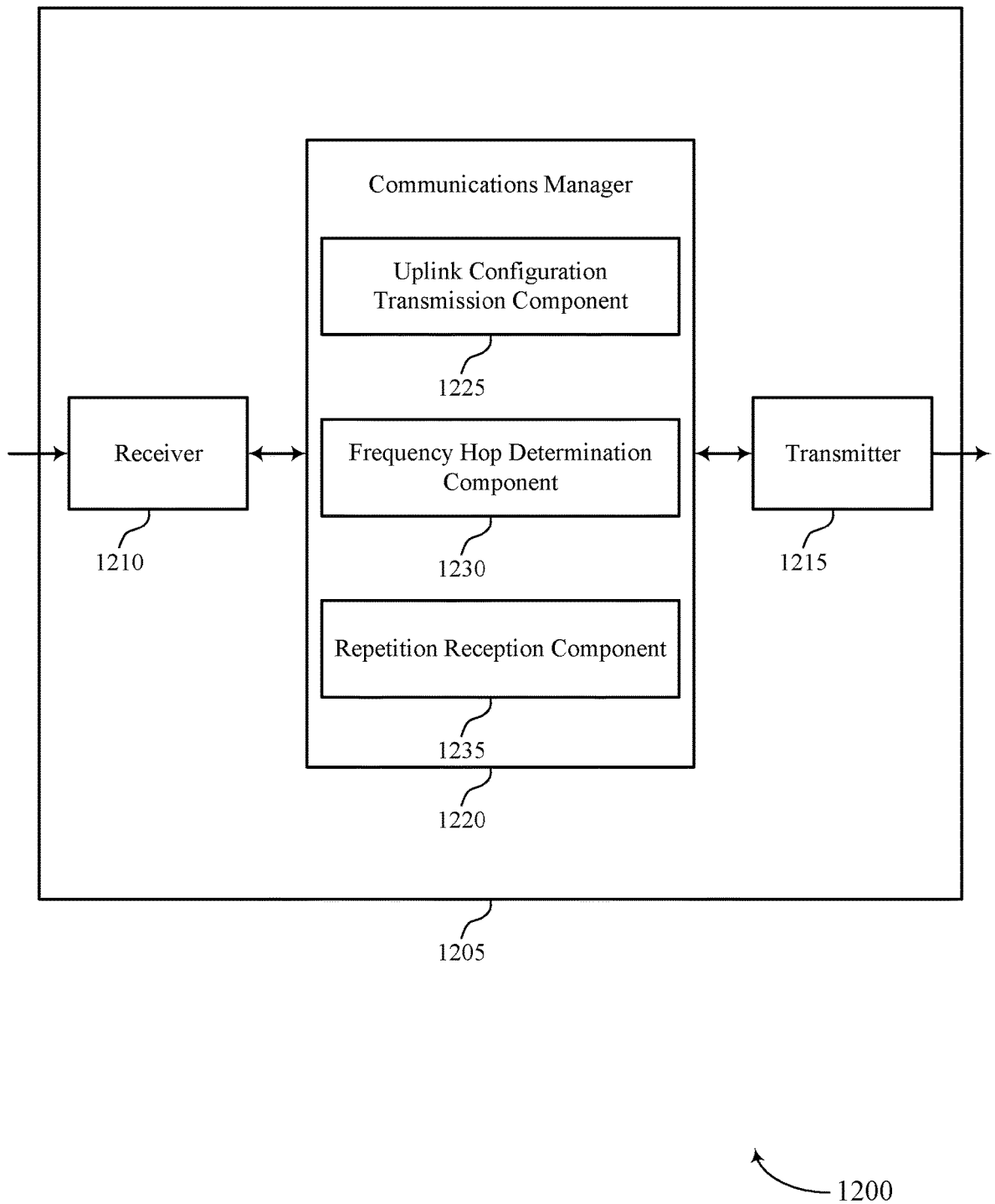

FIG. 12 shows a block diagram 1200 of a device 1205 that supports frequency hopping techniques for uplink shared channel repetitions in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to frequency hopping techniques for uplink shared channel repetitions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to frequency hopping techniques for uplink shared channel repetitions). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of frequency hopping techniques for uplink shared channel repetitions as described herein. For example, the communications manager 1220 may include an uplink configuration transmission component 1225, a frequency hop determination component 1230, a repetition reception component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The uplink configuration transmission component 1225 may be configured as or otherwise support a means for transmitting a control message identifying a frequency hop configuration that configures a UE to use frequency hopping when transmitting repetitions of an uplink shared channel. The frequency hop determination component 1230 may be configured as or otherwise support a means for determining, based on the UE being configured with the frequency hop configuration, a frequency hop for each repetition of the uplink shared channel, each frequency hop determined based on a corresponding uplink shared channel index for a respective repetition. The repetition reception component 1235 may be configured as or otherwise support a means for receiving the repetitions of the uplink shared channel using respective frequency hops in accordance with the determination and the frequency hop configuration in slots available for uplink shared channel transmissions.

Figure 13:
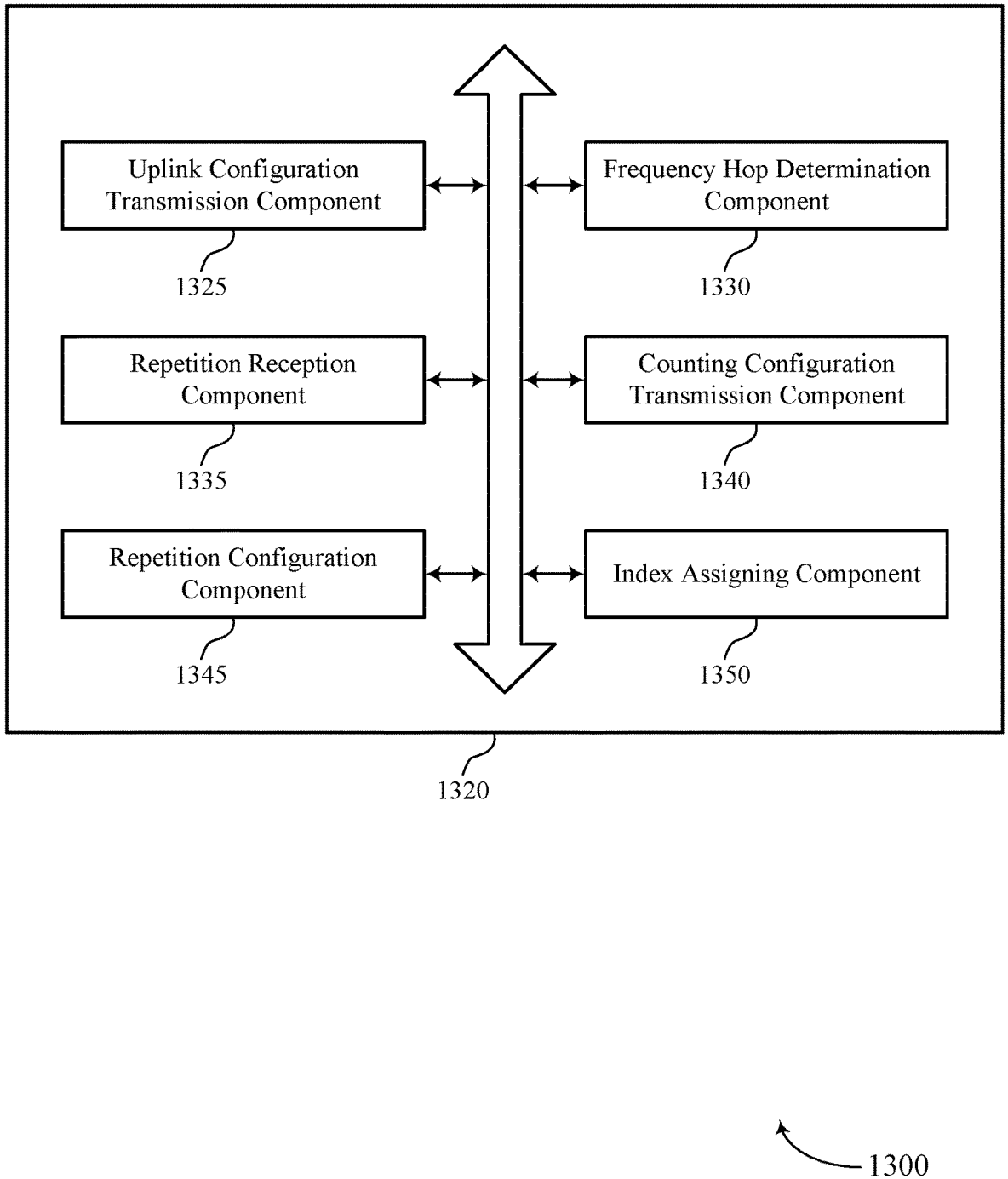
FIG. 13 shows a block diagram of a communications manager that supports frequency hopping techniques for uplink shared channel repetitions in accordance with aspects of the present disclosure.

FIG. 13 shows a block diagram 1300 of a communications manager 1320 that supports frequency hopping techniques for uplink shared channel repetitions in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of frequency hopping techniques for uplink shared channel repetitions as described herein. For example, the communications manager 1320 may include an uplink configuration transmission component 1325, a frequency hop determination component 1330, a repetition reception component 1335, a counting configuration transmission component 1340, a repetition configuration component 1345, an index assigning component 1350, or any combination thereof. Each of these components may communicate, directly or indirectly, with one another (e.g., via one or more buses).

The communications manager 1320 may support wireless communications at a base station in accordance with examples as disclosed herein. The uplink configuration transmission component 1325 may be configured as or otherwise support a means for transmitting a control message identifying a frequency hop configuration that configures a UE to use frequency hopping when transmitting repetitions of an uplink shared channel. The frequency hop determination component 1330 may be configured as or otherwise support a means for determining, based on the UE being configured with the frequency hop configuration, a frequency hop for each repetition of the uplink shared channel, each frequency hop determined based on a corresponding uplink shared channel index for a respective repetition. The repetition reception component 1335 may be configured as or otherwise support a means for receiving the repetitions of the uplink shared channel using respective frequency hops in accordance with the determination and the frequency hop configuration in slots available for uplink shared channel transmissions.

In some examples, to support determining the frequency hop for each repetition of the uplink shared channel, the frequency hop determination component 1330 may be configured as or otherwise support a means for determining the frequency hop for a selected repetition of the uplink shared channel based on an uplink shared channel transmission occasion index corresponding to the selected repetition, where the uplink shared channel transmission occasion index is the uplink shared channel index and pertains to a slot available for uplink shared channel transmissions.

In some examples, to support determining the frequency hop for each repetition of the uplink shared channel, the frequency hop determination component 1330 may be configured as or otherwise support a means for determining the frequency hop for a selected repetition of the uplink shared channel based on an uplink shared channel repetition index corresponding to the selected repetition, where the uplink shared channel repetition index is the uplink shared channel index.

In some examples, to support determining the frequency hop for each repetition of the uplink shared channel, the frequency hop determination component 1330 may be configured as or otherwise support a means for determining the frequency hop for a selected repetition of the uplink shared channel based on a logical index sequentially indexing each of the slots available for uplink shared channel transmissions, where the logical index is the uplink shared channel index.

In some examples, the uplink configuration transmission component 1325 may be configured as or otherwise support a means for transmitting an additional message indicating that at least a portion of a repetition allocated to a slot is canceled. In some examples, the repetition reception component 1335 may be configured as or otherwise support a means for receiving the repetition using a frequency hop associated with a previous repetition based on a number of symbols occupied by the repetition being below a threshold.

In some examples, the counting configuration transmission component 1340 may be configured as or otherwise support a means for transmitting a configuration message indicating a counting configuration for allocating each repetition of the uplink shared channel to a respective slot of a set of multiple slots. In some examples, the uplink configuration transmission component 1325 may be configured as or otherwise support a means for transmitting an indication of a number of repetitions to transmit for the uplink shared channel. In some examples, the repetition configuration component 1345 may be configured as or otherwise support a means for allocating each repetition, up to the number of repetitions, to the set of multiple slots in accordance with the counting configuration.

In some examples, to support allocating each repetition to the slot, the repetition configuration component 1345 may be configured as or otherwise support a means for allocating each repetition, up to the number of repetitions, to uplink configured slots only, where an uplink configured slot is an uplink slot or a special slot available for uplink shared channel transmissions. In some examples, to support allocating each repetition to the slot, the repetition reception component 1335 may be configured as or otherwise support a means for receiving each repetition that is allocated to the uplink configured slots.

In some examples, the repetition configuration component 1345 may be configured as or otherwise support a means for identifying a set of multiple repetitions, where each repetition of the set of multiple repetitions is allocated to an uplink configured slot, where the uplink configured slot is an uplink slot or a special slot available for uplink shared channel transmissions. In some examples, the index assigning component 1350 may be configured as or otherwise support a means for assigning a first uplink shared channel index to a first repetition of the set of multiple repetitions. In some examples, the frequency hop determination component 1330 may be configured as or otherwise support a means for determining a first frequency hop for the first repetition based on the first uplink shared channel index being even.

In some examples, the repetition configuration component 1345 may be configured as or otherwise support a means for identifying a set of multiple repetitions, where each repetition of the set of multiple repetitions is allocated to an uplink configured slot, where the uplink configured slot is an uplink slot or a special slot available for uplink shared channel transmissions. In some examples, the index assigning component 1350 may be configured as or otherwise support a means for assigning a second uplink shared channel index to a second repetition of the set of multiple repetitions. In some examples, the frequency hop determination component 1330 may be configured as or otherwise support a means for determining a second frequency hop for the second repetition based on the second uplink shared channel index being odd.

In some examples, the index assigning component 1350 may be configured as or otherwise support a means for identifying a set of multiple uplink transmission occasions. In some examples, the index assigning component 1350 may be configured as or otherwise support a means for assigning each uplink transmission occasion of the set of multiple uplink transmission occasions an uplink shared channel index.

In some examples, determining the frequency hop for each repetition is based on the uplink shared channel index assigned to each uplink transmission occasion being even or odd.

In some examples, the index assigning component 1350 may be configured as or otherwise support a means for assigning a first uplink shared channel index to a first uplink transmission occasion of the set of multiple uplink transmission occasions, a repetition allocated to the first uplink transmission occasion. In some examples, the frequency hop determination component 1330 may be configured as or otherwise support a means for determining a first frequency hop for the repetition allocated to the first uplink transmission occasion based on the first uplink shared channel index being even.

In some examples, the index assigning component 1350 may be configured as or otherwise support a means for assigning a second uplink shared channel index to a second uplink transmission occasion of the set of multiple uplink transmission occasions, a repetition allocated to the second uplink transmission occasion. In some examples, the frequency hop determination component 1330 may be configured as or otherwise support a means for determining a second frequency hop for the repetition allocated to the second uplink transmission occasion based on the second uplink shared channel index being odd.

In some examples, to support receiving the repetitions of the uplink shared channel, the repetition reception component 1335 may be configured as or otherwise support a means for receiving each repetition of the uplink shared channel in a same starting location in each of a plurality of uplink configured slots, where each repetition is transmitted for a same duration.

Figure 14:
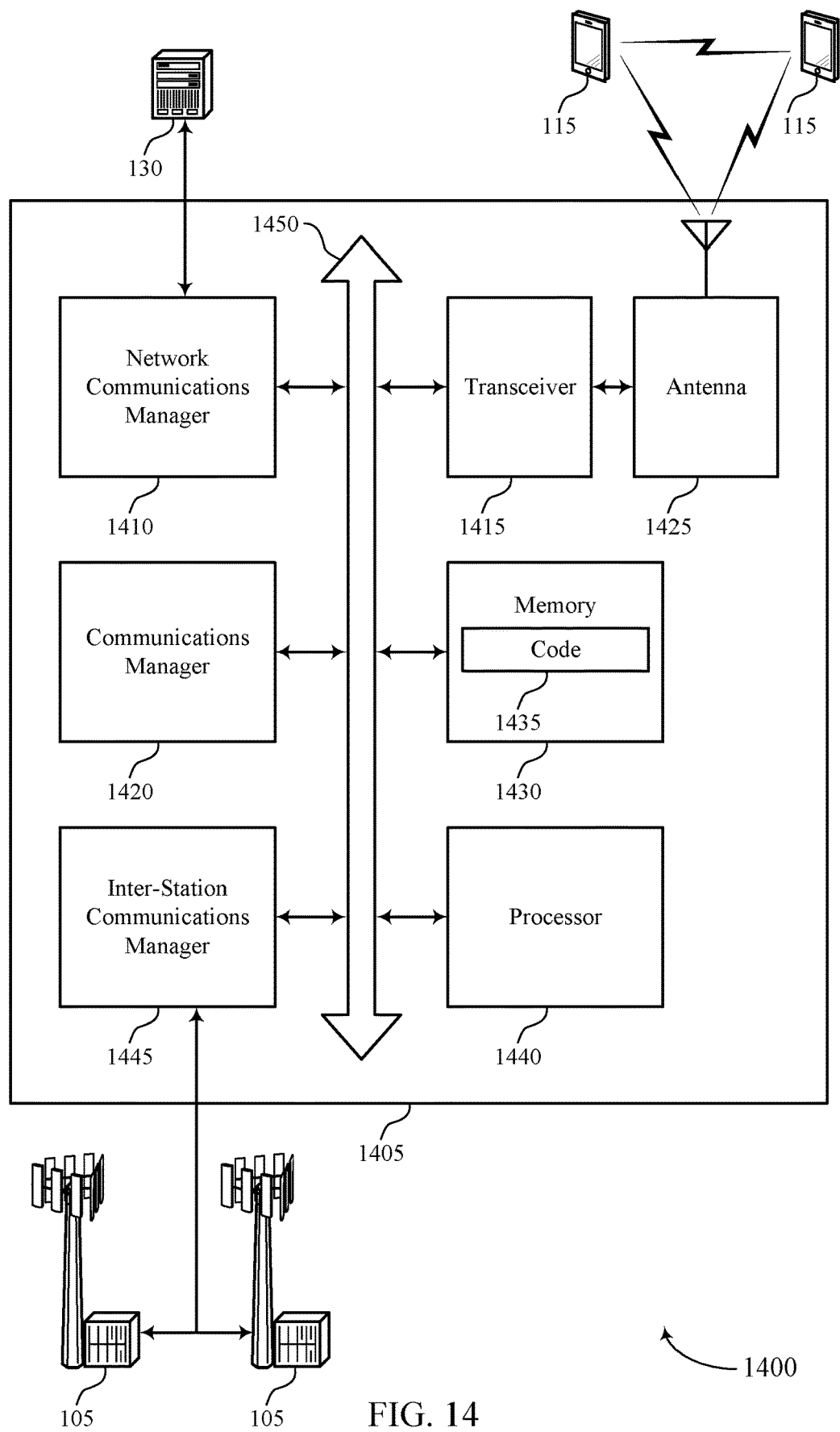
FIG. 14 shows a diagram of a system including a device that supports frequency hopping techniques for uplink shared channel repetitions in accordance with aspects of the present disclosure.

FIG. 14 shows a diagram of a system 1400 including a device 1405 that supports frequency hopping techniques for uplink shared channel repetitions in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting frequency hopping techniques for uplink shared channel repetitions). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting a control message identifying a frequency hop configuration that configures a UE to use frequency hopping when transmitting repetitions of an uplink shared channel. The communications manager 1420 may be configured as or otherwise support a means for determining, based on the UE being configured with the frequency hop configuration, a frequency hop for each repetition of the uplink shared channel, each frequency hop determined based on a corresponding uplink shared channel index for a respective repetition. The communications manager 1420 may be configured as or otherwise support a means for receiving the repetitions of the uplink shared channel using respective frequency hops in accordance with the determination and the frequency hop configuration in slots available for uplink shared channel transmissions.

By including or configuring the communications manager 1420 in accordance with examples as described herein, the device 1405 may support techniques for improved communication reliability, more efficient utilization of communication resources, and improved coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of frequency hopping techniques for uplink shared channel repetitions as described herein, or the processor 1440 and the memory 1430 may be otherwise configured to perform or support such operations.

Figure 15:
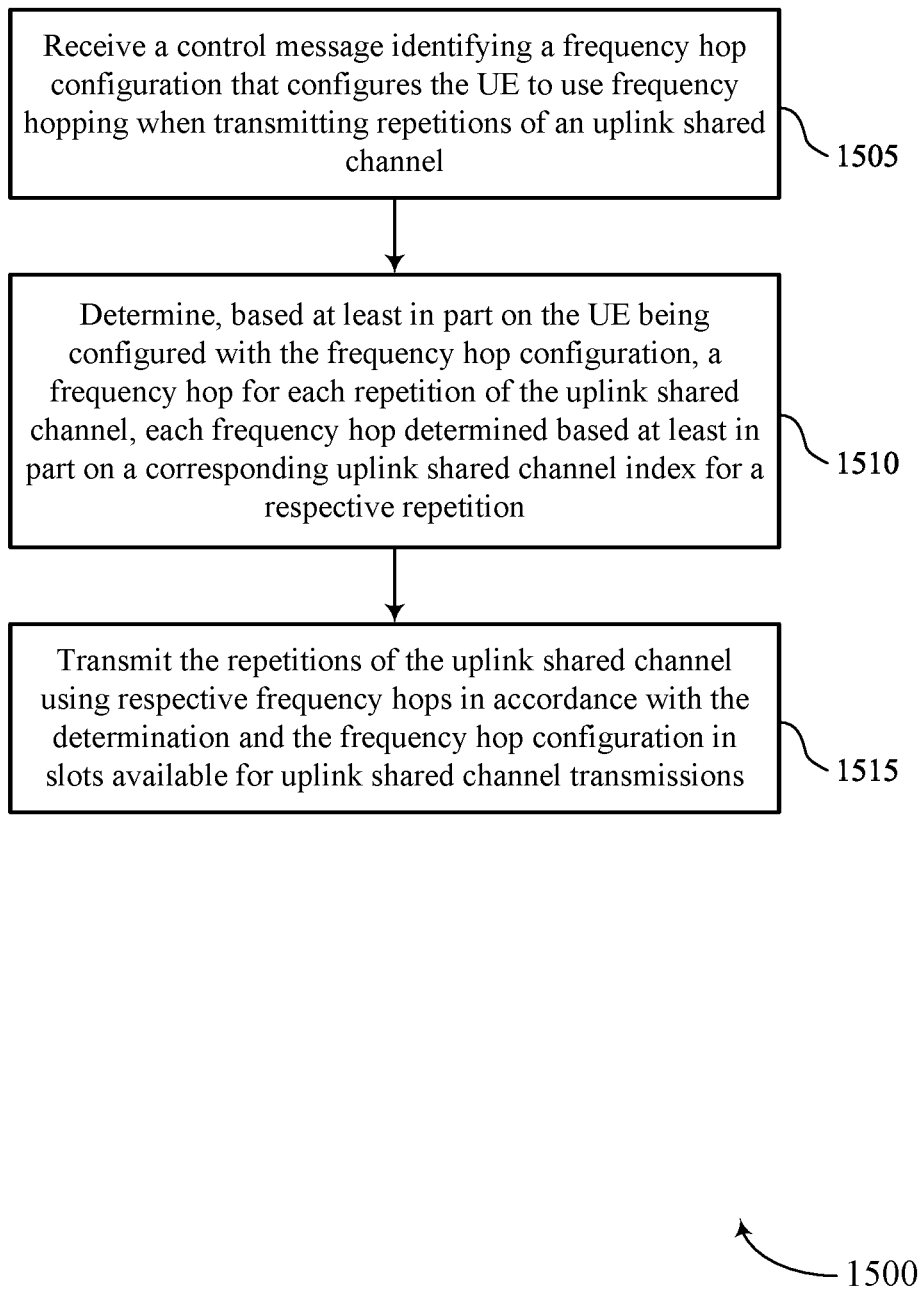
FIGS. 15 through 18 show flowcharts illustrating methods that support frequency hopping techniques for uplink shared channel repetitions in accordance with aspects of the present disclosure.

FIG. 15 shows a flowchart illustrating a method 1500 that supports frequency hopping techniques for uplink shared channel repetitions in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving a control message identifying a frequency hop configuration that configures the UE to use frequency hopping when transmitting repetitions of an uplink shared channel. The operations of 1505 may be performed in accordance with examples as disclosed herein. In some examples, aspects of the operations of 1505 may be performed by an uplink configuration reception manager 925 as described with reference to FIG. 9.

At 1510, the method may include determining, based on the UE being configured with the frequency hop configuration, a frequency hop for each repetition of the uplink shared channel, each frequency hop determined based on a corresponding uplink shared channel index for a respective repetition. The operations of 1510 may be performed in accordance with examples as disclosed herein. In some examples, aspects of the operations of 1510 may be performed by a frequency hop determination manager 930 as described with reference to FIG. 9.

At 1515, the method may include transmitting the repetitions of the uplink shared channel using respective frequency hops in accordance with the determination and the frequency hop configuration in slots available for uplink shared channel transmissions. The operations of 1515 may be performed in accordance with examples as disclosed herein. In some examples, aspects of the operations of 1515 may be performed by a repetition transmission manager 935 as described with reference to FIG. 9.

Figure 16:
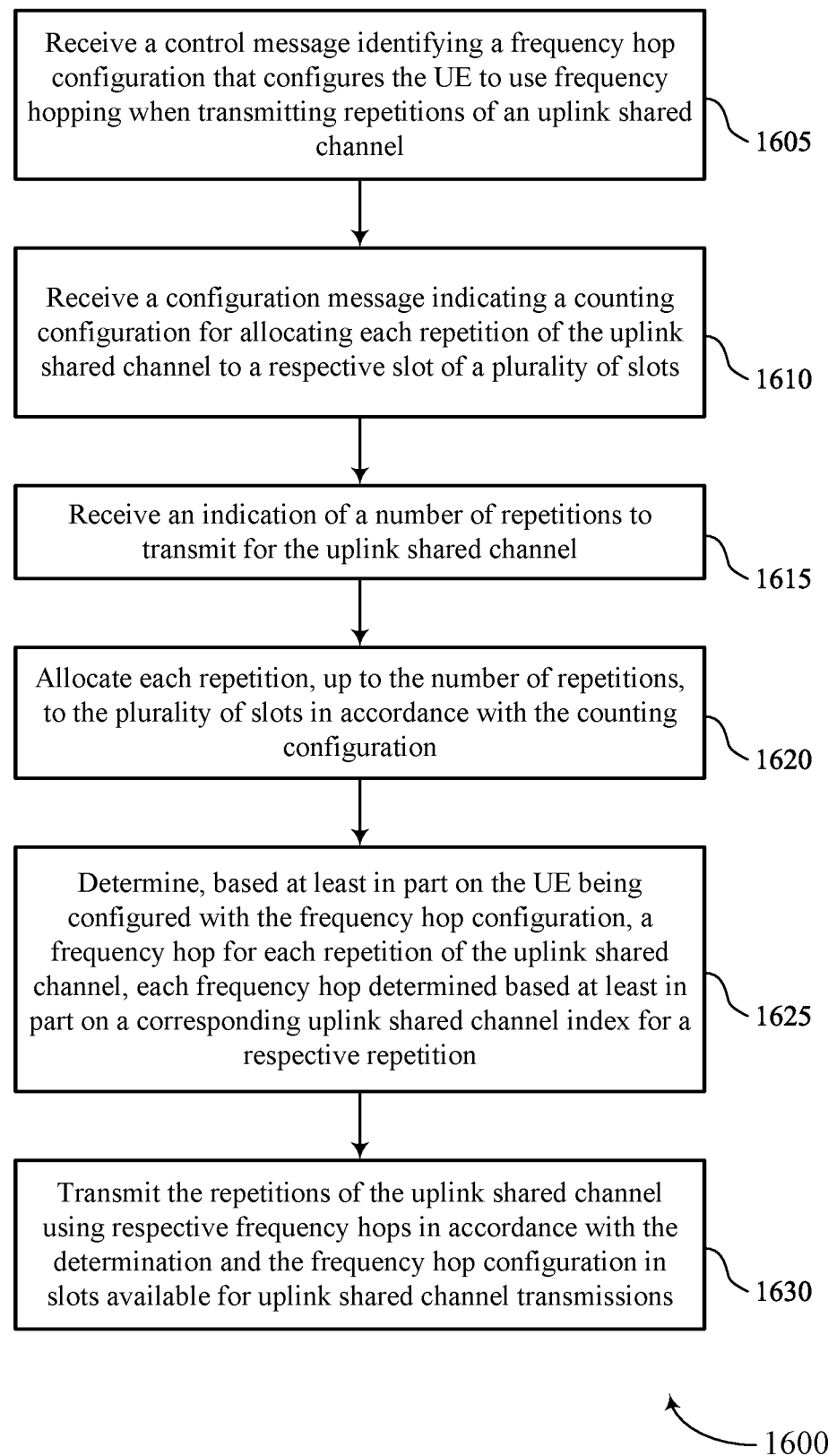

FIG. 16 shows a flowchart illustrating a method 1600 that supports frequency hopping techniques for uplink shared channel repetitions in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving a control message identifying a frequency hop configuration that configures the UE to use frequency hopping when transmitting repetitions of an uplink shared channel. The operations of 1605 may be performed in accordance with examples as disclosed herein. In some examples, aspects of the operations of 1605 may be performed by an uplink configuration reception manager 925 as described with reference to FIG. 9.

At 1610, the method may include receiving a configuration message indicating a counting configuration for allocating each repetition of the uplink shared channel to a respective slot of a set of multiple slots. The operations of 1610 may be performed in accordance with examples as disclosed herein. In some examples, aspects of the operations of 1610 may be performed by a counting configuration manager 945 as described with reference to FIG. 9.

At 1615, the method may include receiving an indication of a number of repetitions to transmit for the uplink shared channel. The operations of 1615 may be performed in accordance with examples as disclosed herein. In some examples, aspects of the operations of 1615 may be performed by an uplink configuration reception manager 925 as described with reference to FIG. 9.

At 1620, the method may include allocating each repetition, up to the number of repetitions, to the set of multiple slots in accordance with the counting configuration. The operations of 1620 may be performed in accordance with examples as disclosed herein. In some examples, aspects of the operations of 1620 may be performed by a repetition configuration manager 940 as described with reference to FIG. 9.

At 1625, the method may include determining, based on the UE being configured with the frequency hop configuration, a frequency hop for each repetition of the uplink shared channel, each frequency hop determined based on a corresponding uplink shared channel index for a respective repetition. The operations of 1625 may be performed in accordance with examples as disclosed herein. In some examples, aspects of the operations of 1625 may be performed by a frequency hop determination manager 930 as described with reference to FIG. 9.

At 1630, the method may include transmitting the repetitions of the uplink shared channel using respective frequency hops in accordance with the determination and the frequency hop configuration in slots available for uplink shared channel transmissions. The operations of 1630 may be performed in accordance with examples as disclosed herein. In some examples, aspects of the operations of 1630 may be performed by a repetition transmission manager 935 as described with reference to FIG. 9.

Figure 17:
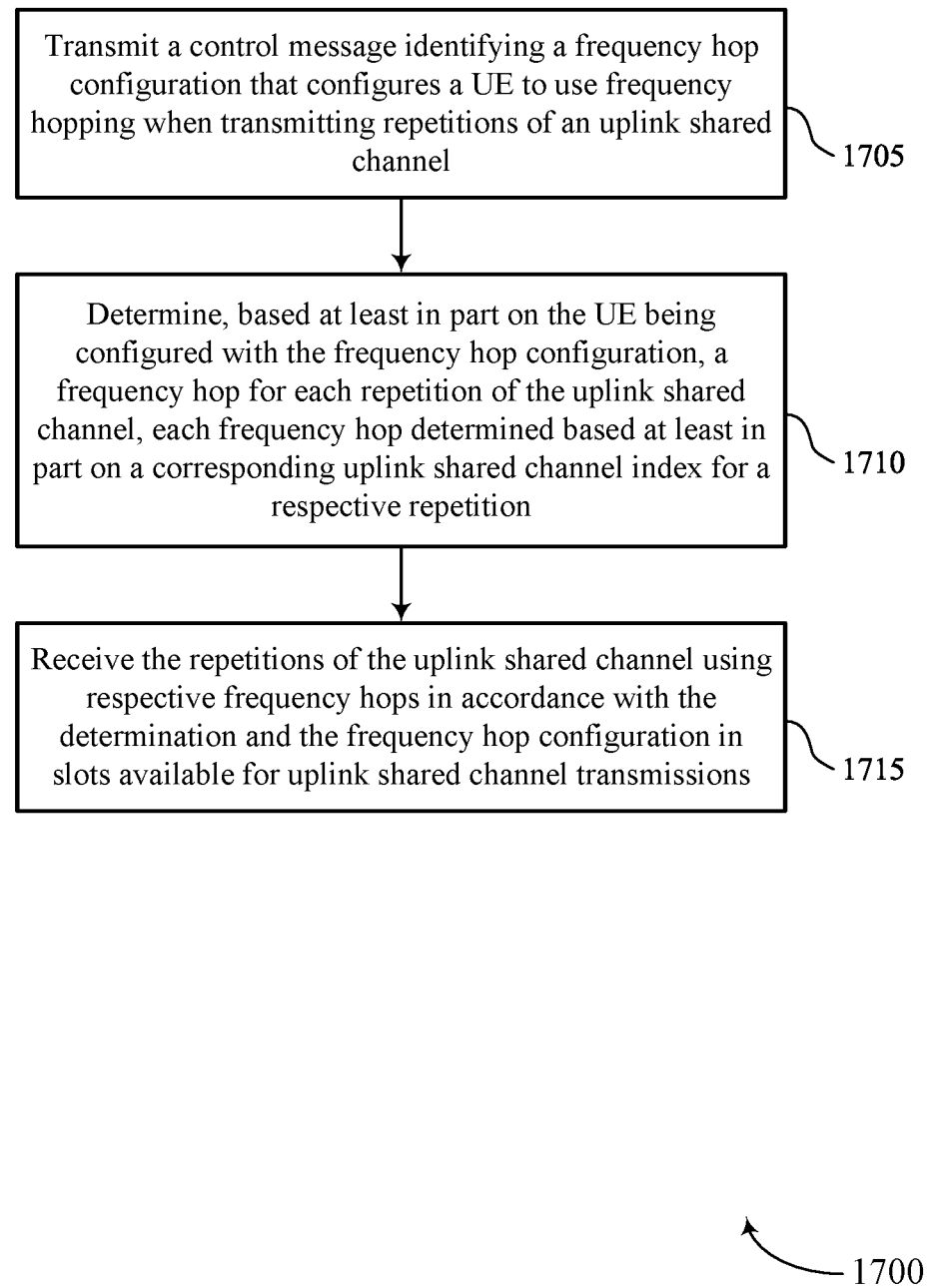

FIG. 17 shows a flowchart illustrating a method 1700 that supports frequency hopping techniques for uplink shared channel repetitions in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting a control message identifying a frequency hop configuration that configures a UE to use frequency hopping when transmitting repetitions of an uplink shared channel. The operations of 1705 may be performed in accordance with examples as disclosed herein. In some examples, aspects of the operations of 1705 may be performed by an uplink configuration transmission component 1325 as described with reference to FIG. 13.

At 1710, the method may include determining, based on the UE being configured with the frequency hop configuration, a frequency hop for each repetition of the uplink shared channel, each frequency hop determined based on a corresponding uplink shared channel index for a respective repetition. The operations of 1710 may be performed in accordance with examples as disclosed herein. In some examples, aspects of the operations of 1710 may be performed by a frequency hop determination component 1330 as described with reference to FIG. 13.

At 1715, the method may include receiving the repetitions of the uplink shared channel using respective frequency hops in accordance with the determination and the frequency hop configuration in slots available for uplink shared channel transmissions. The operations of 1715 may be performed in accordance with examples as disclosed herein. In some examples, aspects of the operations of 1715 may be performed by a repetition reception component 1335 as described with reference to FIG. 13.

Figure 18:
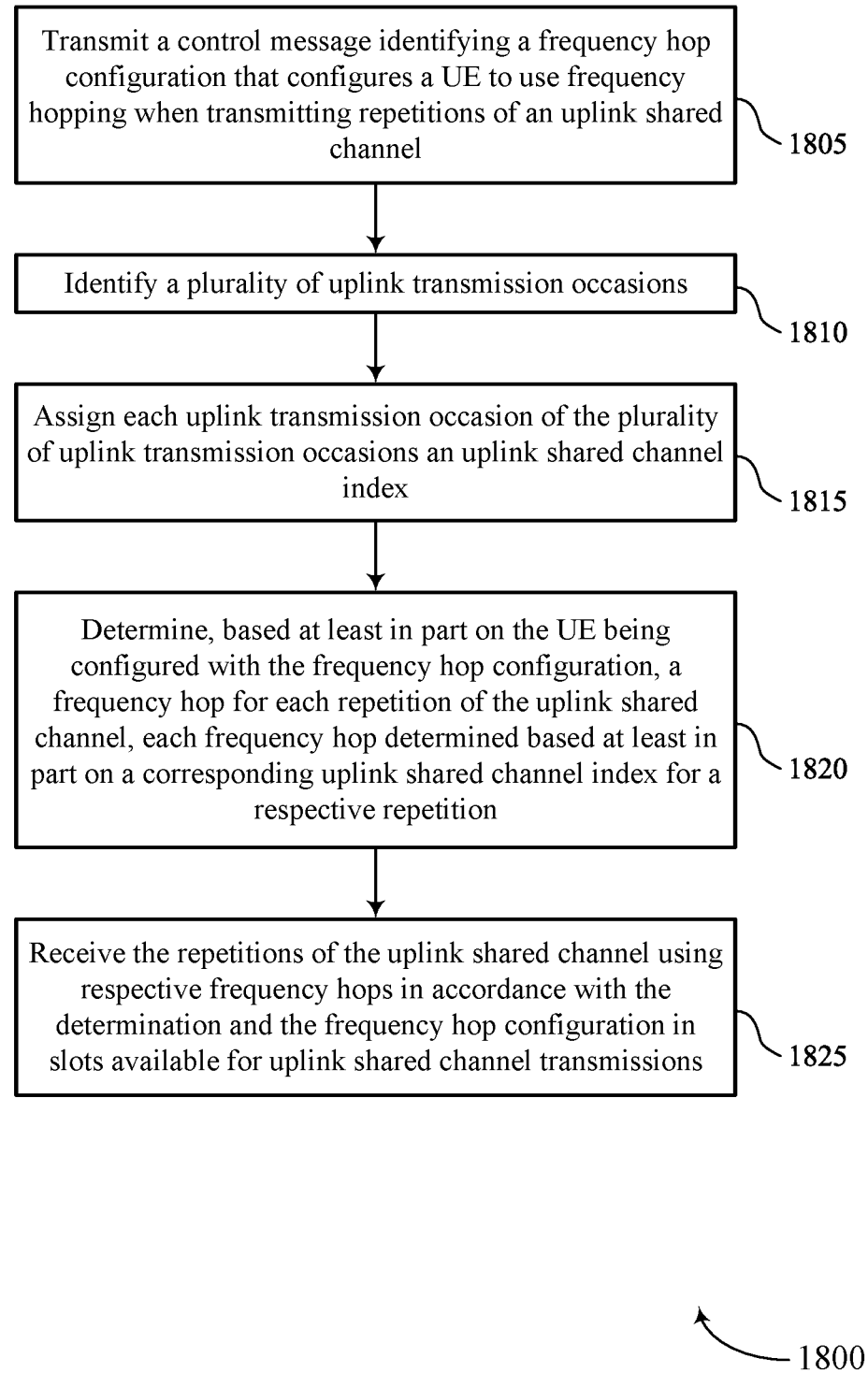

FIG. 18 shows a flowchart illustrating a method 1800 that supports frequency hopping techniques for uplink shared channel repetitions in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting a control message identifying a frequency hop configuration that configures a UE to use frequency hopping when transmitting repetitions of an uplink shared channel. The operations of 1805 may be performed in accordance with examples as disclosed herein. In some examples, aspects of the operations of 1805 may be performed by an uplink configuration transmission component 1325 as described with reference to FIG. 13.

At 1810, the method may include identifying a set of multiple uplink transmission occasions. The operations of 1810 may be performed in accordance with examples as disclosed herein. In some examples, aspects of the operations of 1810 may be performed by an index assigning component 1350 as described with reference to FIG. 13.

At 1815, the method may include assigning each uplink transmission occasion of the set of multiple uplink transmission occasions an uplink shared channel index. The operations of 1815 may be performed in accordance with examples as disclosed herein. In some examples, aspects of the operations of 1815 may be performed by an index assigning component 1350 as described with reference to FIG. 13.

At 1820, the method may include determining, based on the UE being configured with the frequency hop configuration, a frequency hop for each repetition of the uplink shared channel, each frequency hop determined based on a corresponding uplink shared channel index for a respective repetition. The operations of 1820 may be performed in accordance with examples as disclosed herein. In some examples, aspects of the operations of 1820 may be performed by a frequency hop determination component 1330 as described with reference to FIG. 13.

At 1825, the method may include receiving the repetitions of the uplink shared channel using respective frequency hops in accordance with the determination and the frequency hop configuration in slots available for uplink shared channel transmissions. The operations of 1825 may be performed in accordance with examples as disclosed herein. In some examples, aspects of the operations of 1825 may be performed by a repetition reception component 1335 as described with reference to FIG. 13.

The following provides an overview of aspects of the present disclosure:

Aspect 1: A method for wireless communications at a UE, comprising: receiving a control message identifying a frequency hop configuration that configures the UE to use frequency hopping when transmitting repetitions of an uplink shared channel; determining, based at least in part on the UE being configured with the frequency hop configuration, a frequency hop for each repetition of the uplink shared channel, each frequency hop determined based at least in part on a corresponding uplink shared channel index for a respective repetition; and transmitting the repetitions of the uplink shared channel using respective frequency hops in accordance with the determination and the frequency hop configuration in slots available for uplink shared channel transmissions.

Aspect 2: The method of aspect 1, wherein determining the frequency hop for each repetition of the uplink shared channel further comprises: determining the frequency hop for a selected repetition of the uplink shared channel based at least in part on an uplink shared channel transmission occasion index corresponding to the selected repetition, wherein the uplink shared channel transmission occasion index is the uplink shared channel index and pertains to a slot available for uplink shared channel transmissions.

Aspect 3: The method of aspect 1, wherein determining the frequency hop for each repetition of the uplink shared channel further comprises: determining the frequency hop for a selected repetition of the uplink shared channel based at least in part on an uplink shared channel repetition index corresponding to the selected repetition, wherein the uplink shared channel repetition index is the uplink shared channel index.

Aspect 4: The method of aspect 1, wherein determining the frequency hop for each repetition of the uplink shared channel further comprises: determining the frequency hop for a selected repetition of the uplink shared channel based at least in part on a logical index sequentially indexing each of the slots available for uplink shared channel transmissions, wherein the logical index is the uplink shared channel index.

Aspect 5: The method of any of aspects 1 through 4, further comprising: receiving an additional message indicating that at least a portion of a repetition allocated to a slot is canceled; determining that a number of symbols occupied by the repetition is below a threshold; and transmitting the repetition using a frequency hop associated with a previous repetition.

Aspect 6: The method of any of aspects 1 through 5, further comprising: receiving a configuration message indicating a counting configuration for allocating each repetition of the uplink shared channel to a respective slot of a plurality of slots; receiving an indication of a number of repetitions to transmit for the uplink shared channel; and allocating each repetition, up to the number of repetitions, to the plurality of slots in accordance with the counting configuration.

Aspect 7: The method of aspect 6, wherein allocating each repetition to the slot further comprises: allocating each repetition, up to the number of repetitions, to uplink configured slots only, wherein an uplink configured slot is an uplink slot or a special slot available for uplink shared transmissions; and transmitting each repetition that is allocated to the uplink configured slots.

Aspect 8: The method of any of aspects 6 through 7, wherein allocating each repetition further comprises: identifying a plurality of repetitions, wherein each repetition of the plurality of repetitions is allocated to an uplink configured slot, wherein the uplink configured slot is an uplink slot or a special slot available for uplink shared channel transmissions.

Aspect 9: The method of aspect 8, further comprising: assigning a first uplink shared channel index to a first repetition of the plurality of repetitions; and determining a first frequency hop for the first repetition based at least in part on the first uplink shared channel index being even.

Aspect 10: The method of any of aspects 8 through 9, further comprising: assigning a second uplink shared channel index to a second repetition of the plurality of repetitions; and determining a second frequency hop for the second repetition based at least in part on the second uplink shared channel index being odd.

Aspect 11: The method of any of aspects 1 through 10, further comprising: identifying a plurality of uplink transmission occasions; and assigning each uplink transmission occasion of the plurality of uplink transmission occasions an uplink shared channel index.

Aspect 12: The method of aspect 11, wherein determining the frequency hop for each repetition is based at least in part on the uplink shared channel index assigned to each uplink transmission occasion being even or odd.

Aspect 13: The method of aspect 12, further comprising: assigning a first uplink shared channel index to a first uplink transmission occasion of the plurality of uplink transmission occasions, a repetition allocated to the first uplink transmission occasion; and determining a first frequency hop for the repetition allocated to the first uplink transmission occasion based at least in part on the first uplink shared channel index being even.

Aspect 14: The method of any of aspects 12 through 13, further comprising: assigning a second uplink shared channel index to a second uplink transmission occasion of the plurality of uplink transmission occasions, a repetition allocated to the second uplink transmission occasion; and determining a second frequency hop for the repetition allocated to the second uplink transmission occasion based at least in part on the second uplink shared channel index being odd.

Aspect 15: The method of any of aspects 1 through 14, wherein transmitting the repetitions of the uplink shared channel further comprises: transmitting each repetition of the uplink shared channel in a same starting location in each of a plurality of uplink configured slots, wherein each repetition is transmitted for a same duration.

Aspect 16: The method of any of aspects 1 through 15, wherein the UE transmits the repetitions of the uplink shared channel in accordance with a time division duplexing frame structure or a frequency division duplexing frame structure.

Aspect 17: A method for wireless communications at a base station, comprising: transmitting a control message identifying a frequency hop configuration that configures a UE to use frequency hopping when transmitting repetitions of an uplink shared channel; determining, based at least in part on the UE being configured with the frequency hop configuration, a frequency hop for each repetition of the uplink shared channel, each frequency hop determined based at least in part on a corresponding uplink shared channel index for a respective repetition; and receiving the repetitions of the uplink shared channel using respective frequency hops in accordance with the determination and the frequency hop configuration in slots available for uplink shared channel transmissions.

Aspect 18: The method of aspect 17, wherein determining the frequency hop for each repetition of the uplink shared channel further comprises: determining the frequency hop for a selected repetition of the uplink shared channel based at least in part on an uplink shared channel transmission occasion index corresponding to the selected repetition, wherein the uplink shared channel transmission occasion index is the uplink shared channel index and pertains to a slot available for uplink shared channel transmissions.

Aspect 19: The method of aspect 17, wherein determining the frequency hop for each repetition of the uplink shared channel further comprises: determining the frequency hop for a selected repetition of the uplink shared channel based at least in part on an uplink shared channel repetition index corresponding to the selected repetition, wherein the uplink shared channel repetition index is the uplink shared channel index.

Aspect 20: The method of aspect 17, wherein determining the frequency hop for each repetition of the uplink shared channel further comprises: determining the frequency hop for a selected repetition of the uplink shared channel based at least in part on a logical index sequentially indexing each of the slots available for uplink shared channel transmissions, wherein the logical index is the uplink shared channel index.

Aspect 21: The method of any of aspects 17 through 20, further comprising: transmitting an additional message indicating that at least a portion of a repetition allocated to a slot is canceled; and receiving the repetition using a frequency hop associated with a previous repetition based at least in part on a number of symbols occupied by the repetition being below a threshold.

Aspect 22: The method of any of aspects 17 through 21, further comprising: transmitting a configuration message indicating a counting configuration for allocating each repetition of the uplink shared channel to a respective slot of a plurality of slots; transmitting an indication of a number of repetitions to transmit for the uplink shared channel; and allocating each repetition, up to the number of repetitions, to the plurality of slots in accordance with the counting configuration.

Aspect 23: The method of aspect 22, wherein allocating each repetition to the slot further comprises: allocating each repetition, up to the number of repetitions, to uplink configured slots only, wherein an uplink configured slot is an uplink slot or a special slot available for uplink shared channel transmissions; and receiving each repetition that is allocated to the uplink configured slots.

Aspect 24: The method of any of aspects 22 through 23, further comprising: identifying a plurality of repetitions, wherein each repetition of the plurality of repetitions is allocated to an uplink configured slot, wherein the uplink configured slot is an uplink slot or a special slot available for uplink shared channel transmissions; assigning a first uplink shared channel index to a first repetition of the plurality of repetitions; and determining a first frequency hop for the first repetition based at least in part on the first uplink shared channel index being even.

Aspect 25: The method of any of aspects 22 through 24, further comprising: identifying a plurality of repetitions, wherein each repetition of the plurality of repetitions is allocated to an uplink configured slot, wherein the uplink configured slot is an uplink slot or a special slot available for uplink shared channel transmissions; assigning a second uplink shared channel index to a second repetition of the plurality of repetitions; and determining a second frequency hop for the second repetition based at least in part on the second uplink shared channel index being odd.

Aspect 26: The method of any of aspects 17 through 25, further comprising: identifying a plurality of uplink transmission occasions; and assigning each uplink transmission occasion of the plurality of uplink transmission occasions an uplink shared channel index.

Aspect 27: The method of aspect 26, wherein determining the frequency hop for each repetition is based at least in part on the uplink shared channel index assigned to each uplink transmission occasion being even or odd.

Aspect 28: The method of aspect 27, further comprising: assigning a first uplink shared channel index to a first uplink transmission occasion of the plurality of uplink transmission occasions, a repetition allocated to the first uplink transmission occasion; and determining a first frequency hop for the repetition allocated to the first uplink transmission occasion based at least in part on the first uplink shared channel index being even.

Aspect 29: The method of any of aspects 27 through 28, further comprising: assigning a second uplink shared channel index to a second uplink transmission occasion of the plurality of uplink transmission occasions, a repetition allocated to the second uplink transmission occasion; and determining a second frequency hop for the repetition allocated to the second uplink transmission occasion based at least in part on the second uplink shared channel index being odd.

Aspect 30: The method of any of aspects 17 through 29, wherein receiving the repetitions of the uplink shared channel further comprises: receiving each repetition of the uplink shared channel in a same starting location in each of a plurality of uplink configured slots, wherein each repetition is transmitted for a same duration.

Aspect 31: An apparatus for wireless communications, comprising a processor; memory coupled with the processor; and instructions stored in the memory and executable by the processor to cause the apparatus to perform a method of any of aspects 1 through 16.

Aspect 32: An apparatus for wireless communications, comprising at least one means for performing a method of any of aspects 1 through 16.

Aspect 33: A non-transitory computer-readable medium storing code for wireless communications at a UE, the code comprising instructions executable by a processor to perform a method of any of aspects 1 through 16.

Aspect 34: An apparatus for wireless communications, comprising a processor; memory coupled with the processor; and instructions stored in the memory and executable by the processor to cause the apparatus to perform a method of any of aspects 17 through 30.

Aspect 35: An apparatus for wireless communications, comprising at least one means for performing a method of any of aspects 17 through 30.

Aspect 36: A non-transitory computer-readable medium storing code for wireless communications at a base station, the code comprising instructions executable by a processor to perform a method of any of aspects 17 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a control message identifying a frequency hop configuration that configures the UE to use frequency hopping when transmitting repetitions of an uplink shared channel;
   determining, based at least in part on the UE being configured with the frequency hop configuration, a frequency hop for each repetition of the uplink shared channel, each frequency hop determined based at least in part on an uplink shared channel index corresponding to each respective repetition; and
   transmitting the repetitions of the uplink shared channel using respective frequency hops in accordance with the determination and the frequency hop configuration in slots available for uplink shared channel transmissions.

2. The method of claim 1, wherein determining the frequency hop for each repetition of the uplink shared channel further comprises:
   determining the frequency hop for a selected repetition of the uplink shared channel based at least in part on an uplink shared channel transmission occasion index corresponding to the selected repetition, wherein the uplink shared channel transmission occasion index is the uplink shared channel index and pertains to a slot available for uplink shared channel transmissions.

3. The method of claim 1, wherein determining the frequency hop for each repetition of the uplink shared channel further comprises:
   determining the frequency hop for a selected repetition of the uplink shared channel based at least in part on an uplink shared channel repetition index corresponding to the selected repetition, wherein the uplink shared channel repetition index is the uplink shared channel index.

4. The method of claim 1, wherein determining the frequency hop for each repetition of the uplink shared channel further comprises:
determining the frequency hop for a selected repetition of the uplink shared channel based at least in part on a logical index sequentially indexing each of the slots available for uplink shared channel transmissions, wherein the logical index is the uplink shared channel index.

5. The method of claim 1, further comprising:
receiving an additional message indicating that at least a portion of a repetition allocated to a slot is canceled;
determining that a number of symbols occupied by the repetition is below a threshold; and
transmitting the repetition using a frequency hop associated with a previous repetition.

6. The method of claim 1, further comprising:
receiving a configuration message indicating a counting configuration for allocating each repetition of the uplink shared channel to a respective slot of a plurality of slots;
receiving an indication of a number of repetitions to transmit for the uplink shared channel; and
allocating each repetition, up to the number of repetitions, to the plurality of slots in accordance with the counting configuration.

7. The method of claim 6, wherein allocating each repetition to the slot further comprises:
allocating each repetition, up to the number of repetitions, to uplink configured slots only, wherein an uplink configured slot is an uplink slot or a special slot available for uplink shared channel transmissions; and
transmitting each repetition that is allocated to the uplink configured slots.

8. The method of claim 6, wherein allocating each repetition further comprises:
identifying a plurality of repetitions, wherein each repetition of the plurality of repetitions is allocated to an uplink configured slot, wherein the uplink configured slot is an uplink slot or a special slot available for uplink shared channel transmissions.

9. The method of claim 8, further comprising:
assigning a first uplink shared channel index to a first repetition of the plurality of repetitions; and
determining a first frequency hop for the first repetition based at least in part on the first uplink shared channel index being even.

10. The method of claim 8, further comprising:
assigning a second uplink shared channel index to a second repetition of the plurality of repetitions; and
determining a second frequency hop for the second repetition based at least in part on the second uplink shared channel index being odd.

11. The method of claim 1, further comprising:
identifying a plurality of uplink transmission occasions; and
assigning each uplink transmission occasion of the plurality of uplink transmission occasions an uplink shared channel index.

12. The method of claim 11, wherein determining the frequency hop for each repetition is based at least in part on the uplink shared channel index assigned to each uplink transmission occasion being even or odd.

13. The method of claim 12, further comprising:
assigning a first uplink shared channel index to a first uplink transmission occasion of the plurality of uplink transmission occasions, a repetition allocated to the first uplink transmission occasion; and
determining a first frequency hop for the repetition allocated to the first uplink transmission occasion based at least in part on the first uplink shared channel index being even.

14. The method of claim 12, further comprising:
assigning a second uplink shared channel index to a second uplink transmission occasion of the plurality of uplink transmission occasions, a repetition allocated to the second uplink transmission occasion; and
determining a second frequency hop for the repetition allocated to the second uplink transmission occasion based at least in part on the second uplink shared channel index being odd.

15. The method of claim 1, wherein transmitting the repetitions of the uplink shared channel further comprises:
transmitting each repetition of the uplink shared channel in a same starting location in each of a plurality of uplink configured slots, wherein each repetition is transmitted for a same duration.

16. A method for wireless communications at a base station, comprising:
transmitting a control message identifying a frequency hop configuration that configures a user equipment (UE) to use frequency hopping when transmitting repetitions of an uplink shared channel;
determining, based at least in part on the UE being configured with the frequency hop configuration, a frequency hop for each repetition of the uplink shared channel, each frequency hop determined based at least in part on an uplink shared channel index corresponding to each respective repetition; and
receiving the repetitions of the uplink shared channel using respective frequency hops in accordance with the determination and the frequency hop configuration in slots available for uplink shared channel transmissions.

17. The method of claim 16, wherein determining the frequency hop for each repetition of the uplink shared channel further comprises:
determining the frequency hop for a selected repetition of the uplink shared channel based at least in part on an uplink shared channel transmission occasion index corresponding to the selected repetition, wherein the uplink shared channel transmission occasion index is the uplink shared channel index and pertains to a slot available for uplink shared channel transmissions.

18. The method of claim 16, wherein determining the frequency hop for each repetition of the uplink shared channel further comprises:
determining the frequency hop for a selected repetition of the uplink shared channel based at least in part on an uplink shared channel repetition index corresponding to the selected repetition, wherein the uplink shared channel repetition index is the uplink shared channel index.

19. The method of claim 16, wherein determining the frequency hop for each repetition of the uplink shared channel further comprises:
determining the frequency hop for a selected repetition of the uplink shared channel based at least in part on a logical index sequentially indexing each of the slots available for uplink shared channel transmissions, wherein the logical index is the uplink shared channel index.

20. The method of claim 16, further comprising:
transmitting an additional message indicating that at least a portion of a repetition allocated to a slot is canceled; and
receiving the repetition using a frequency hop associated with a previous repetition based at least in part on a number of symbols occupied by the repetition being below a threshold.

21. The method of claim 16, further comprising:
transmitting a configuration message indicating a counting configuration for allocating each repetition of the uplink shared channel to a respective slot of a plurality of slots;
transmitting an indication of a number of repetitions to transmit for the uplink shared channel; and
allocating each repetition, up to the number of repetitions, to the plurality of slots in accordance with the counting configuration.

22. The method of claim 21, wherein allocating each repetition to the slot further comprises:
allocating each repetition, up to the number of repetitions, to uplink configured slots only, wherein an uplink configured slot is an uplink slot or a special slot available for uplink shared channel transmissions; and
receiving each repetition that is allocated to the uplink configured slots.

23. The method of claim 21, further comprising:
identifying a plurality of repetitions, wherein each repetition of the plurality of repetitions is allocated to an uplink configured slot, wherein the uplink configured slot is an uplink slot or a special slot available for uplink shared channel transmissions;
assigning a first uplink shared channel index to a first repetition of the plurality of repetitions; and
determining a first frequency hop for the first repetition based at least in part on the first uplink shared channel index being even.

24. The method of claim 21, further comprising:
identifying a plurality of repetitions, wherein each repetition of the plurality of repetitions is allocated to an uplink configured slot, wherein the uplink configured slot is an uplink slot or a special slot available for uplink shared channel transmissions;
assigning a second uplink shared channel index to a second repetition of the plurality of repetitions; and
determining a second frequency hop for the second repetition based at least in part on the second uplink shared channel index being odd.

25. The method of claim 16, further comprising:
identifying a plurality of uplink transmission occasions; and
assigning each uplink transmission occasion of the plurality of uplink transmission occasions an uplink shared channel index.

26. The method of claim 25, wherein determining the frequency hop for each repetition is based at least in part on the uplink shared channel index assigned to each uplink transmission occasion being even or odd.

27. The method of claim 26, further comprising:
assigning a first uplink shared channel index to a first uplink transmission occasion of the plurality of uplink transmission occasions, a repetition allocated to the first uplink transmission occasion; and
determining a first frequency hop for the repetition allocated to the first uplink transmission occasion based at least in part on the first uplink shared channel index being even.

28. The method of claim 26, further comprising:
assigning a second uplink shared channel index to a second uplink transmission occasion of the plurality of uplink transmission occasions, a repetition allocated to the second uplink transmission occasion; and
determining a second frequency hop for the repetition allocated to the second uplink transmission occasion based at least in part on the second uplink shared channel index being odd.

29. An apparatus for wireless communications, comprising:
one or more memories storing processor-executable code and
one or more processors coupled with the one or memories and individually or collectively operable to cause the apparatus to:
receive a control message identifying a frequency hop configuration that configures a user equipment (UE) to use frequency hopping when transmitting repetitions of an uplink shared channel;
determine, based at least in part on the UE being configured with the frequency hop configuration, a frequency hop for each repetition of the uplink shared channel, each frequency hop determined based at least in part on an uplink shared channel index corresponding to each respective repetition; and
transmit the repetitions of the uplink shared channel using respective frequency hops in accordance with the determination and the frequency hop configuration in slots available for uplink shared channel transmissions.

30. An apparatus for wireless communications, comprising:
one or more memories storing processor-executable code and
one or more processors coupled with the one or memories and individually or collectively operable to cause the apparatus to:
transmit a control message identifying a frequency hop configuration that configures a user equipment (UE) to use frequency hopping when transmitting repetitions of an uplink shared channel;
determine, based at least in part on the UE being configured with the frequency hop configuration, a frequency hop for each repetition of the uplink shared channel, each frequency hop determined based at least in part on an uplink shared channel index corresponding to each respective repetition; and
receive the repetitions of the uplink shared channel using respective frequency hops in accordance with the determination and the frequency hop configuration in slots available for uplink shared channel transmissions.

* * * * *